US011922264B2

(12) United States Patent
Volkerink et al.

(10) Patent No.: US 11,922,264 B2
(45) Date of Patent: Mar. 5, 2024

(54) SYSTEM AND METHOD OF UTILIZING 3D VISION FOR ASSET MANAGEMENT AND TRACKING

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 125 days.

(21) Appl. No.: 17/450,061

(22) Filed: Oct. 5, 2021

(65) Prior Publication Data

US 2022/0108088 A1 Apr. 7, 2022

Related U.S. Application Data

(60) Provisional application No. 63/117,329, filed on Nov. 23, 2020, provisional application No. 63/087,324, filed on Oct. 5, 2020.

(51) Int. Cl.
*G06K 7/10* (2006.01)
*G06K 7/00* (2006.01)

(52) U.S. Cl.
CPC ......... *G06K 7/1092* (2013.01); *G06K 7/0004* (2013.01); *G06K 7/0095* (2013.01)

(58) Field of Classification Search
None
See application file for complete search history.

(56) References Cited

U.S. PATENT DOCUMENTS

| | | |
|---|---|---|
| 9,325,899 B1 | 4/2016 | Chou et al. |
| 2004/0221790 A1 | 11/2004 | Sinclair et al. |
| 2009/0279741 A1 | 11/2009 | Susca et al. |
| 2010/0034426 A1 | 2/2010 | Takiguchi |
| 2013/0308820 A1 | 11/2013 | Richards |
| 2016/0014394 A1 | 1/2016 | Suhr et al. |
| 2017/0045889 A1 | 2/2017 | Yamaguchi et al. |
| 2017/0064287 A1 | 3/2017 | Borisov |
| 2017/0353943 A1 | 12/2017 | Skaaksrud |
| 2018/0024562 A1 | 1/2018 | Bellaiche |
| 2018/0210465 A1 | 7/2018 | Qu et al. |
| 2018/0211400 A1 | 7/2018 | Park et al. |
| 2022/0122436 A1* | 4/2022 | Volkerink .............. G08B 25/10 |

(Continued)

OTHER PUBLICATIONS

U.S. Appl. No. 11/067,995, filed Jul. 20, 2021, Weiser et al.

(Continued)

*Primary Examiner* — Suezu Ellis

(57) ABSTRACT

A system for determining a load status of an asset container, comprising: a first tape node having a first low-power wireless-communications interface and a first camera, the first tape node operable to capture and transmit a first image; and a second tape node, comprising: a second camera; a second low-power wireless-communication interface; a processor; and memory communicatively coupled with the processor and storing machine-readable instructions that, when executed by the processor, cause the processor to: receive, from the first tape node, the first image; capture a second image using the second camera; perform computer vision techniques on the first and second images to generate the load status of the asset container; and transmit the load status to a nearby node.

19 Claims, 23 Drawing Sheets

(56) References Cited

U.S. PATENT DOCUMENTS

2023/0196038 A1* 6/2023 Leung .................... G06K 1/121
235/494

OTHER PUBLICATIONS

Agrawal et al. "Real-time Localization in Outdoor Environments using Stereo Vision and Inexpensive GPS." In: 18th International Conference on Pattern Recognition (ICPR'06), Aug. 20-24, 2006. Retrieved from the Internet on Nov. 3, 2020.

Krombach et al. "Feature-based Visual Odometry Prior for Real-time Semi-dense Stereo SLAM." In: Robotics and autonomous Systems vol. 109, Nov. 2018. Retrieved from the Internet on Nov. 3, 2020.

Furgale. "Extensions to the Visual Odometry Pipeline for the Exploration of Planetary Surfaces." In: A thesis submitted in conformity with the requirements for the degree of Doctor of Philosophy Graduate Department of Aerospace Science and Engineering University of Toronto [Shortened: pp. i-ii, 13-53], 2011. Retrieved from the internet on Nov. 3, 2020.

PCT International Search Report, International Application No. PCT/US 20/39362. International search completed Nov. 4, 2020. International Search Report dated Nov. 16, 2020. pp. 1-5.

U.S. Appl. No. 16/911,287 Non-Final Office Action dated Jul. 28, 2021, 52 pages.

International Patent Application No. PCT/US2021/053663, International Search Report and Written Opinion dated Jan. 12, 2022, 13 pages.

U.S. Appl. No. 16/911,287, Final Office Action dated Feb. 8, 2022, 34 pages.

* cited by examiner

SYSTEM AND METHOD OF UTILIZING 3D VISION FOR ASSET MANAGEMENT AND TRACKING

RELATED APPLICATIONS

This application claims priority to U.S. Patent Application Ser. No. 63/087,324, titled "3D VISION FOR LOADING OF ASSETS AND METHOD THEREOF", filed Oct. 5, 2020, and claims priority to U.S. Patent Application Ser. No. 63/117,329, titled "ASSET MANAGEMENT AND TRACKING USING INFRARED VISION AND AUGMENTED REALITY", filed Nov. 23, 2020, and incorporated herein by reference.

BACKGROUND

In fleet management, determining a loading status of a truck trailer (e.g., how full a truck trailer is) is difficult using optical and image-based detection methods. Conventional methods may be limited by communication bandwidth and data throughput, in addition to the computational complexity of performing such detection methods.

When tracking multiple assets, it may be difficult to guide a user to a specific asset among the multiple assets. Even in situations where the location of each asset is tracked, the granularity of the location tracking may not be such that a user may quickly and efficiently locate an asset that the user is looking for. For example, if a user knows that an asset is in a particular storeroom, it may still take a long time for the user to locate the asset within the storeroom. This is especially true if there are multiple assets that have a similar appearance to the asset that is being looked for (e.g., a single box among a group of boxes).

SUMMARY

In one embodiment, a system for determining a load status of an asset container, comprising: a first tape node having a first low-power wireless-communications interface and a first camera, the first tape node operable to capture and transmit a first image; and a second tape node, comprising: a second camera; a second low-power wireless-communication interface; a processor; and memory communicatively coupled with the processor and storing machine-readable instructions that, when executed by the processor, cause the processor to: receive, from the first tape node, the first image; capture a second image using the second camera; perform computer vision techniques on the first and second images to generate the load status of the asset container; and transmit the load status to a nearby node.

In another embodiment, a system for determining a load status of an asset container, comprising: a first tape node having a first low-power wireless-communications interface and a first camera operable to capture a first image; a second tape node comprising: a second camera; a second low-power wireless-communication interface; a processor; and memory communicatively coupled with the processor and storing machine-readable instructions that, when executed by the processor, cause the processor to: receive, from the first tape node, the captured first image; capture a second image using the second camera; transmit, to a wireless node having another low-power wireless-communications interface, the captured first and second images to generate a load status of the asset container; receive, from the wireless node and based on computer vision techniques on the first and second images, a load status of the asset container; and transmit a notification to a nearby node that includes the determined load status of the asset container.

In yet another embodiment, a method for determining a load status of an asset container, comprising: capturing, by a first embedded camera of a first tape node adhered to a first surface, a first image of within the asset container; receiving, by the first tape node, a second image of within the asset container captured by a second embedded camera of a second tape node adhered to a second surface, a second image within the asset container; and determine, by performing computer vision techniques on the first and second images, a load status of the asset container; and transmit the load status of the asset container to a nearby node.

DETAILED DESCRIPTION OF THE EMBODIMENTS

Figure 1:
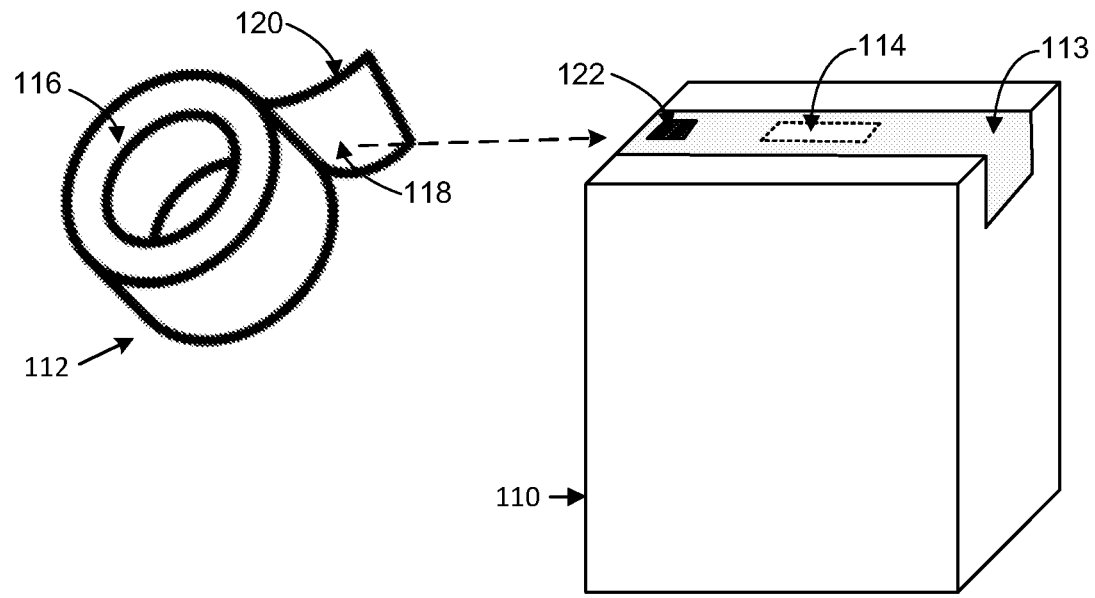
FIG. 1 is a diagrammatic view of a segment of an example adhesive tape platform dispensed from a roll used to detect tampering of an asset, according to an embodiment.

Using conventional methods, a user may not easily find an asset even when the location of the asset is being tracked, since the granularity of the location tracking method is limited. For example, GPS coordinates may locate an area of the asset, but the user is still required to search a large area (e.g., a building or a room) to find the asset. In another example, an asset stored in an area with multiple other assets requires the user to search within the area to find the correct asset. This is particularly true when the user does not know what the asset looks like or when multiple assets appear similar to each other.

In embodiments, a tracking device includes an infrared (IR) emitter (e.g., as a visible light or flashing visible light) that is controllable to emit infrared light. The tracking device is adhered to an asset being tracked. The tracking device wirelessly communicates, at intervals, with a tracking system to report a current location of the asset. In some embodiments, the tracking device includes sensors and transmits sensor data relevant to the asset to the tracking system for tracking environmental conditions of the asset. The tracking system may guide a user to the asset, and an IR emitter of a tape node may be instructed to emit infrared light. A client device (e.g., a smartphone) of the user has an infrared sensor that detects the emitted infrared light. A display of the client device indicates, when proximate the asset and the emitted infrared light is detected by the client device, an output to guide the user to the asset. In some embodiments, the client device displays an augmented reality view, where live video captured by a camera of the client device include an AR overlay to highlight the location of the asset, based on the detected IR light.

By using the tracking device with the infrared display and a client device, the user may efficiently be guided to the exact location of an asset associated with the tracking device and confirm that they have found the correct asset with ease. The user may be guided to an area containing the asset using location tracking data wirelessly communicated from the tracking device. When the user is in the area and in proximity to the asset (e.g., less than fifty feet away from the asset), the user may search for the exact location of the tracking device emitting infrared light from its infrared display using the client device with the infrared sensor.

In some embodiments, the wireless IOT device is an adhesive tape platform or a segment thereof. The adhesive tape platform includes wireless transducing components and circuitry that perform communication and/or sensing. The adhesive tape platform has a flexible adhesive tape form-factor that allows it to function as both an adhesive tape for adhering to and/or sealing objects and a wireless sensing device.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

The term "tape node" refers to an adhesive tape platform or a segment thereof that is equipped with sensor, processor, memory, energy source/harvesting mechanism, and wireless communications functionality, where the adhesive tape platform (also referred to herein as an "adhesive product" or an "adhesive tape product") has a variety of different form factors, including a multilayer roll or a sheet that includes a plurality of divisible adhesive segments. Once deployed, each tape node can function, for example, as an adhesive tape, label, sticker, decal, or the like, and as a wireless communications device.

The terms "adhesive tape node," "wireless node," or "tape node" may be used interchangeably in certain contexts, and refer to an adhesive tape platform or a segment thereof that is equipped with sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "parcel," "envelope," "box," "package," "container," "pallet," "carton," "wrapping," and the like are used interchangeably herein to refer to a packaged item or items.

In certain contexts, the terms "wireless tracking system," "hierarchical communications network," "distributed agent operating system," and the like are used interchangeably herein to refer to a system or network of wireless nodes.

This specification describes a low-cost, multi-function adhesive tape platform with a form factor that unobtrusively integrates the components useful for implementing a combination of different asset tracking and management functions and also is able to perform a useful ancillary function that otherwise would have to be performed with the attendant need for additional materials, labor, and expense. In an aspect, the adhesive tape platform is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various asset management and tracking applications and workflows, including person and object tracking applications, and asset management workflows such as manufacturing, storage, shipping, delivery, and other logistics associated with moving products and other physical objects, including logistics, sensing, tracking, positioning, warehousing, parking, safety, construction, event detection, road management and infrastructure, security, and healthcare. In some examples, the adhesive tape platforms are used in various aspects of asset management, including sealing assets, transporting assets, tracking assets, monitoring the conditions of assets, inventorying assets, and verifying asset security. In these examples, the assets typically are transported from one location to another by truck, train, ship, or aircraft or within premises, e.g., warehouses by forklift, trolleys etc.

In disclosed examples, an adhesive tape platform includes a plurality of segments that can be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. Examples of such applications include event detection applications, monitoring applications, security applications, notification applications, and tracking applications, including inventory tracking, asset tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system directly or through a network of tapes. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and or environment of, for example, an article, object, vehicle, or person, over time.

Systems and processes for fabricating flexible multifunction adhesive tape platforms in efficient and low-cost ways also are described. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other asset tracking and management applications across heterogeneous environments.

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
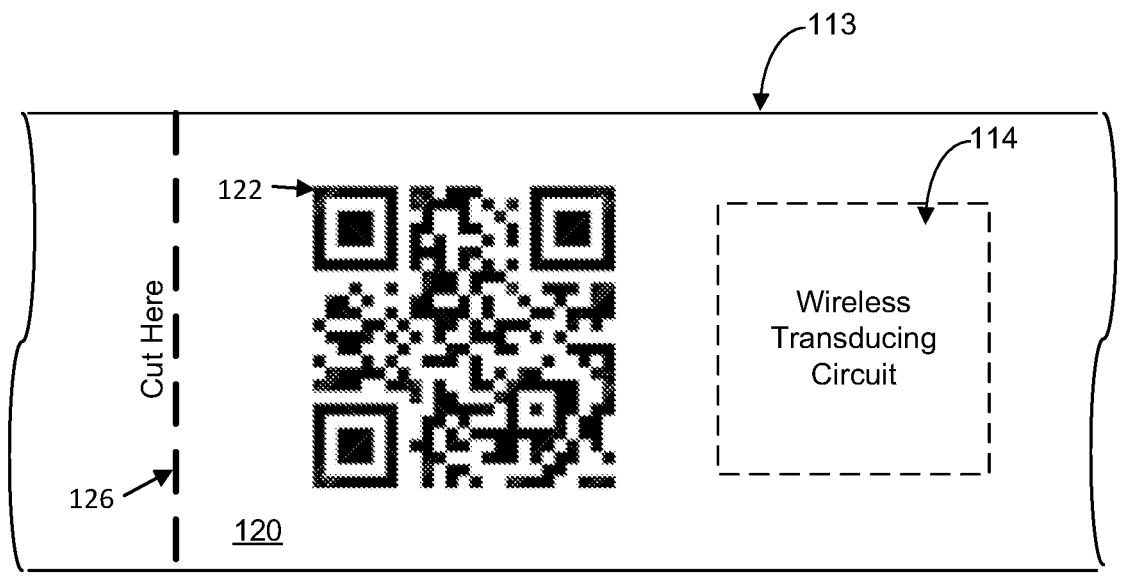
FIG. 2 is a diagrammatic top view of a portion of the segment of the example adhesive tape platform shown in FIG. 1.

FIG. 2 shows the non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example in FIG. 2, the segment 113 of the adhesive tape agent platform 112 includes an identifier 122 (e.g., a two-dimensional bar code, such as a QR Code), written instructions 124 (e.g., "Cut Here"), and an associated cut line 126 that indicates where the user should cut the adhesive tape agent platform 112. The written instructions 124 and the cut line 126 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 126 may demarcate the boundaries between adjacent segments at locations that are free of any active components of the wireless transducing circuit 114. The spacing between the wireless transducing circuit 114 and the cut lines 126 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 126. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 126).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
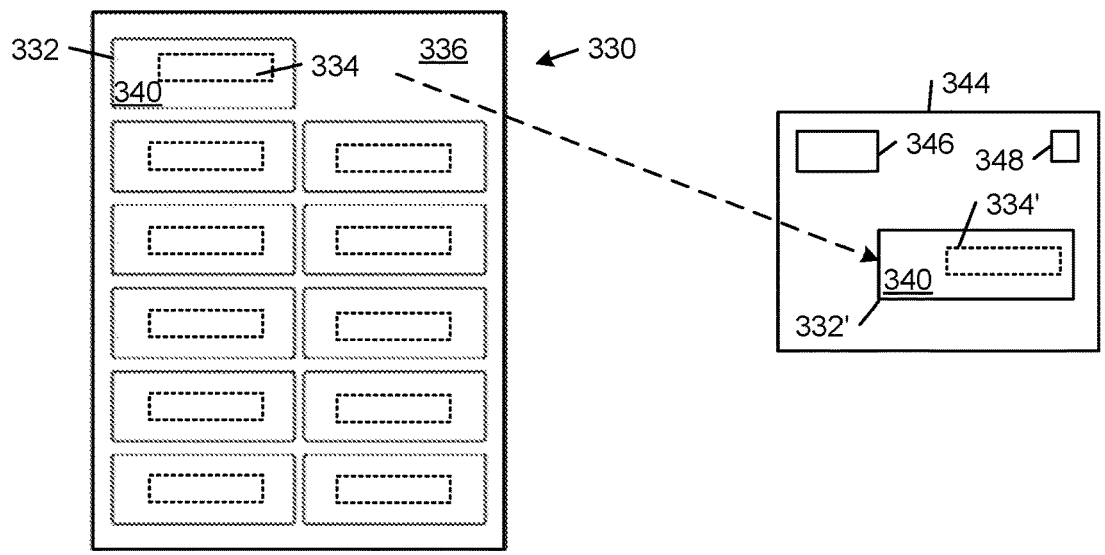
FIG. 3 is a diagrammatic view of an example of an envelope carrying a segment of an example adhesive tape platform dispensed from a backing sheet, according to an embodiment.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 344 also includes a return address 346 and, optionally, a postage stamp or mark 348.

In some examples, segments of the adhesive tape platform 112 are deployed by a human operator. The human operator may be equipped with a mobile phone or other device that allows the operator to authenticate and initialize the adhesive tape platform 112. In addition, the operator can take a picture of a parcel including the adhesive tape platform and any barcodes associated with the parcel and, thereby, create a persistent record that links the adhesive tape platform 12 to the parcel. In addition, the human operator typically will send the picture to a network service and/or transmit the picture to the adhesive tape platform 112 for storage in a memory component of the adhesive tape platform 112.

In some examples, the wireless transducing circuit components 34 that are embedded in a segment 332 of the adhesive tape platform 112 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
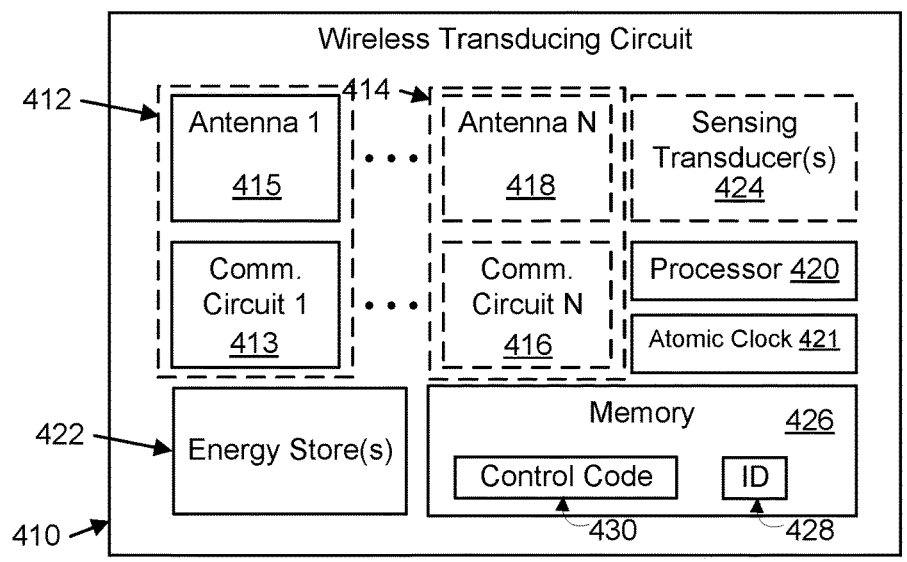
FIG. 4 is a schematic view of an example segment of an adhesive tape platform, according to an embodiment.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Figure 6A:
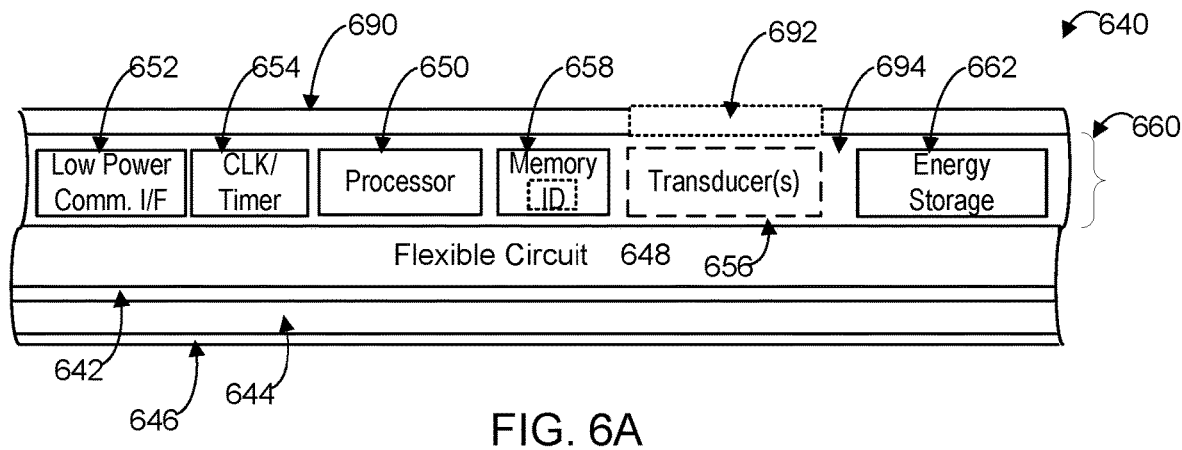
FIGS. 6A-C show diagrammatic cross-sectional side views of portions of different respective adhesive tape platforms, according to an embodiment.
Figure 6B:
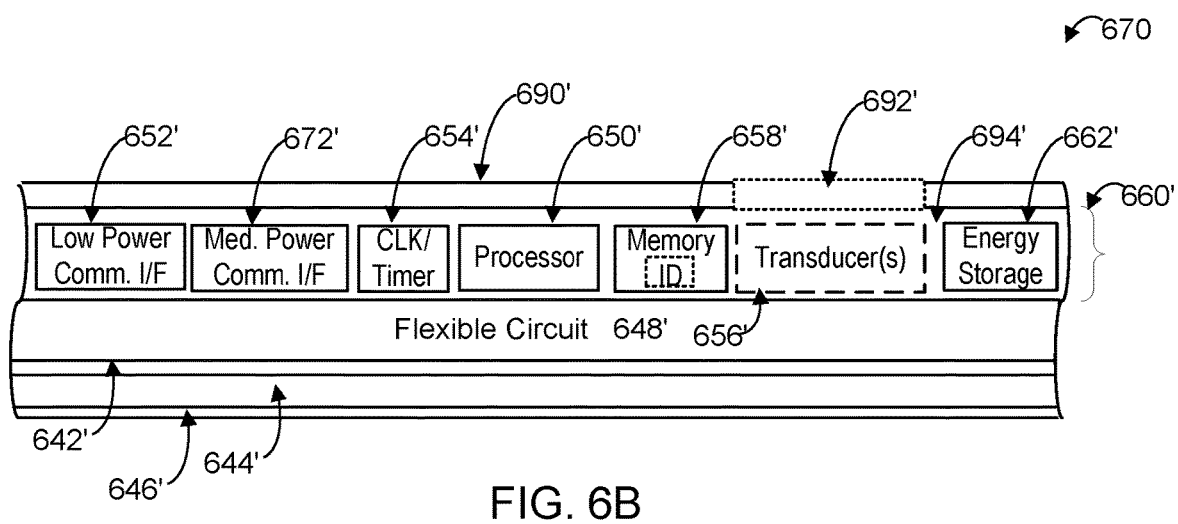
Figure 6C:
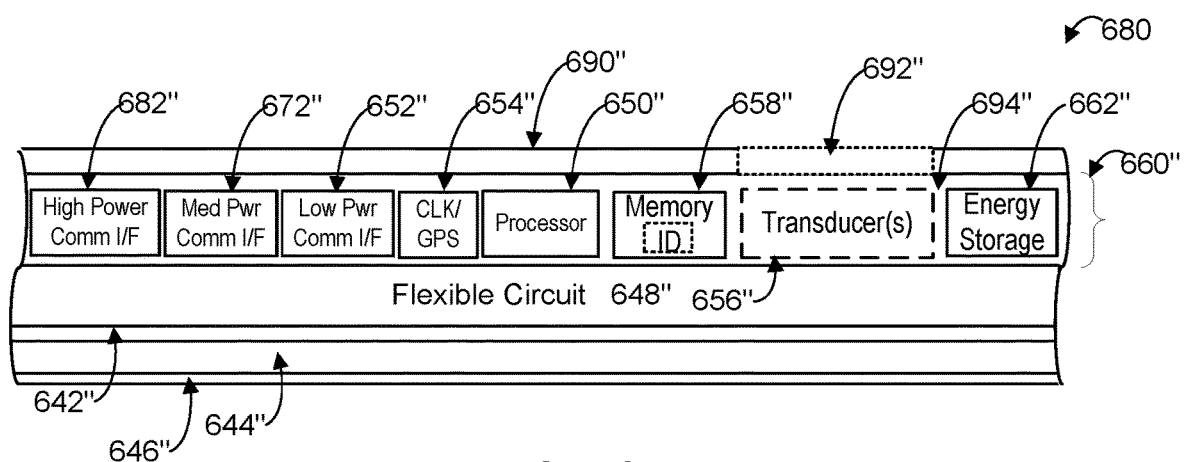

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In some embodiments, memory 426 is integrated in the wireless transducing circuit 410 as shown in FIG. 6A-C. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
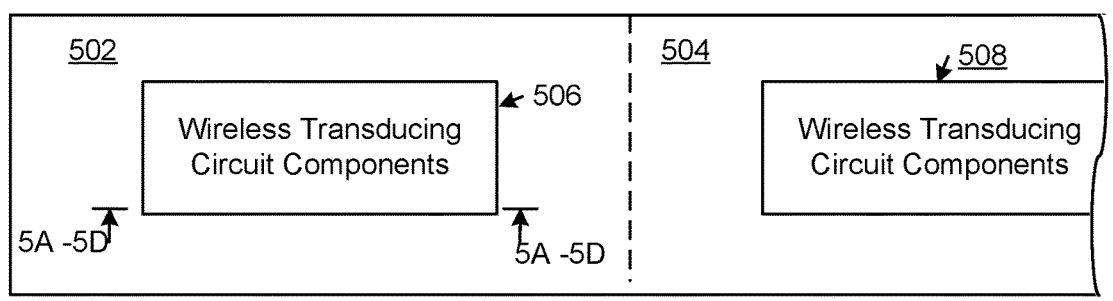
FIG. 5 is a diagrammatic top view of a length of an example adhesive tape platform, according to an embodiment.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 7A:
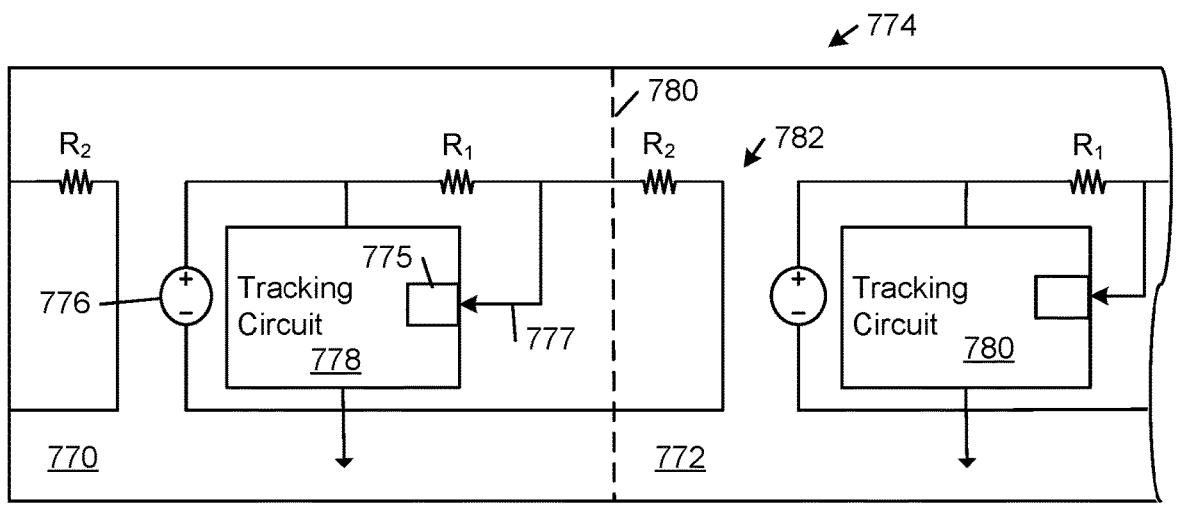
FIGS. 7A-C are diagrammatic top views of a length of an example tracking adhesive tape product, according to an embodiment.
Figure 7B:
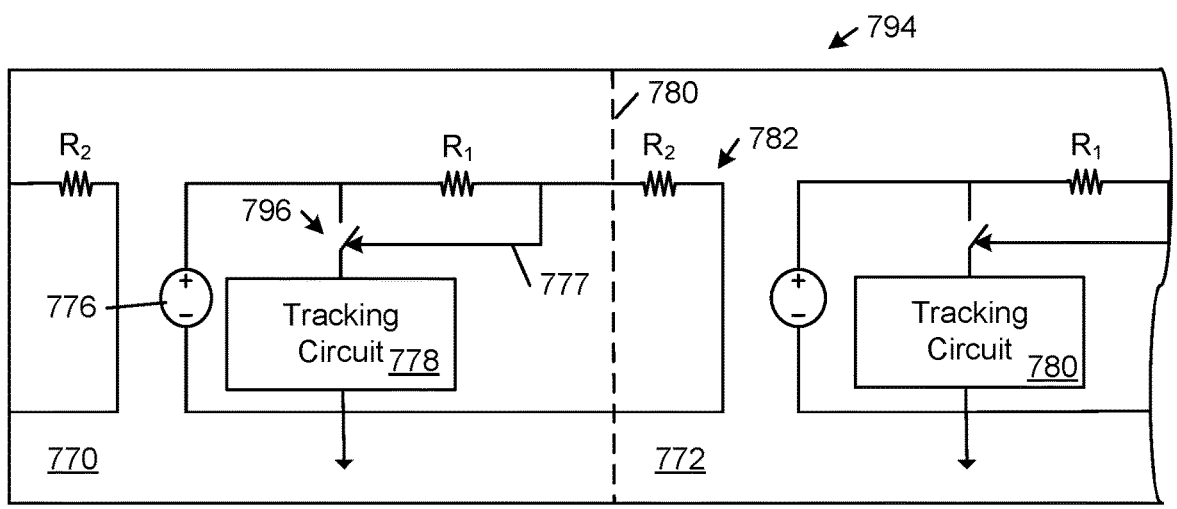
Figure 7C:
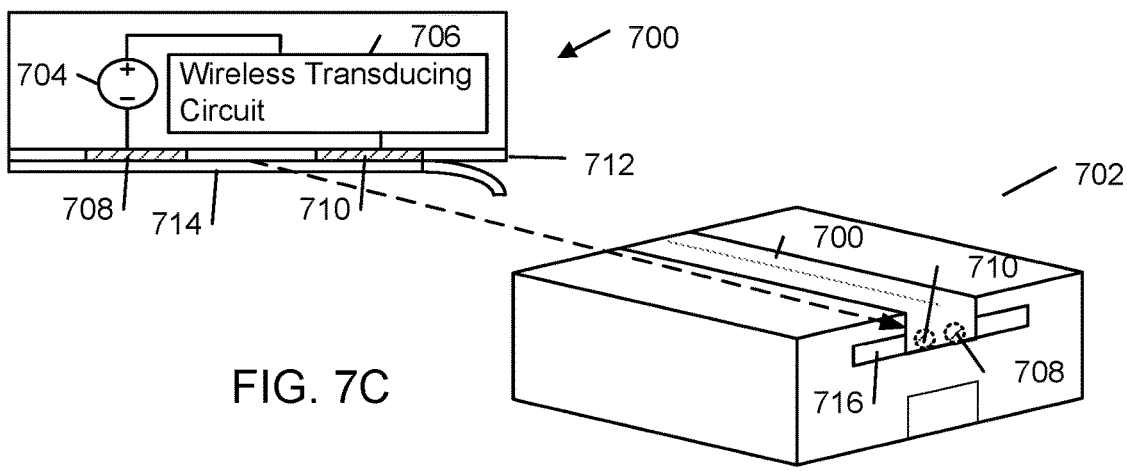

An example method of fabricating the adhesive tape platform 500 according to a roll-to-roll fabrication process is described in connection with FIGS. 5A-5C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A shows a cross-sectional side view of a portion of an example segment 640 of a flexible adhesive tape agent platform (e.g., platform 502 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In some embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 502 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, In some embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648". The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Depending on the target application, the wireless transducing circuits 410 are distributed across the flexible adhesive tape platform 500 according to a specified sampling density, which is the number of wireless transducing circuits 410 for a given unit size (e.g., length or area) of the flexible adhesive tape platform 500. In some examples, a set of multiple flexible adhesive tape platforms 500 are provided that include different respective sampling densities in order to seal different asset sizes with a desired number of wireless transducing circuits 410. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 410. In some example applications (e.g., shipping low value goods), only one wireless transducing circuit 410 is used per asset, whereas in other applications (e.g., shipping high value goods) multiple wireless transducing circuits 410 are used per asset. Thus, a flexible adhesive tape platform 500 with a lower sampling density of wireless transducing circuits 410 can be used for the former application, and a flexible adhesive tape platform 100 with a higher sampling density of wireless transducing circuits 410 can be used for the latter application. In some examples, the flexible adhesive tape platforms 500 are color-coded or otherwise marked to indicate the respective sampling densities with which the wireless transducing circuits 410 are distributed across the different types of adhesive tape platforms 500.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

FIG. 7C shows a diagrammatic cross-sectional front view of an example adhesive tape platform 700 and a perspective view of an example asset 702. Instead of activating the adhesive tape platform 700 in response to separating a segment of the adhesive tape platform 700 from a roll or a sheet of the adhesive tape platform, this example is configured to supply power from the energy source 702 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

An example network communications environment 800 (herein used interchangeably with "network 800" and "IOT system 800") includes a plurality of wireless nodes configured to detect tampering in assets (or other forms of events, such as temperature differentials, humidity differentials, acceleration differentials, etc.). Tampering may include, but is not limited to, opening assets such as boxes, containers, storage, or doors (e.g., of an asset container 764), moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the network 800. The network 800 is configured to provide a notification or alert to a user (e.g., authenticated user) of the network 800. In some embodiments, a wireless node may directly transmit the notification or alert to the user (e.g., to a client device, such as the mobile gateway 810 of a user). In some embodiments, a wireless node may include a display that indicates whether or not a tampering event has occurred (e.g., the display may be an indicator light or LED).

Alerts may be transmitted to the server/cloud, other wireless nodes, a client device, or some combination thereof, as discussed below. For example, in an embodiment, a wireless node of the network 800 captures sensor data, detects a tampering event, and transmits an alarm to a user of the wireless sensing system (e.g., without communicating with a server or cloud of the wireless sensing system). In another embodiment, a wireless node of the network 800 captures sensor data and transmits the sensor data to a gateway, parent node (e.g., black tape), or client device. The gateway, parent node, or client device detects a tampering event based on the received sensor data and transmits an alarm to a user of the network 800. In another embodiment, the wireless node of the network 800 captures sensor data, detects a tampering event, and transmits information describing the tampering event to a server or cloud of the network 800, in the form of a list with tampering events at specific times, along with which tape node or containers were tampered with, as shown in table 1502, discussed in FIG. 15. The server or cloud of the wireless sensing system transmits an alarm to a user of the wireless sensing system.

Figure 8:
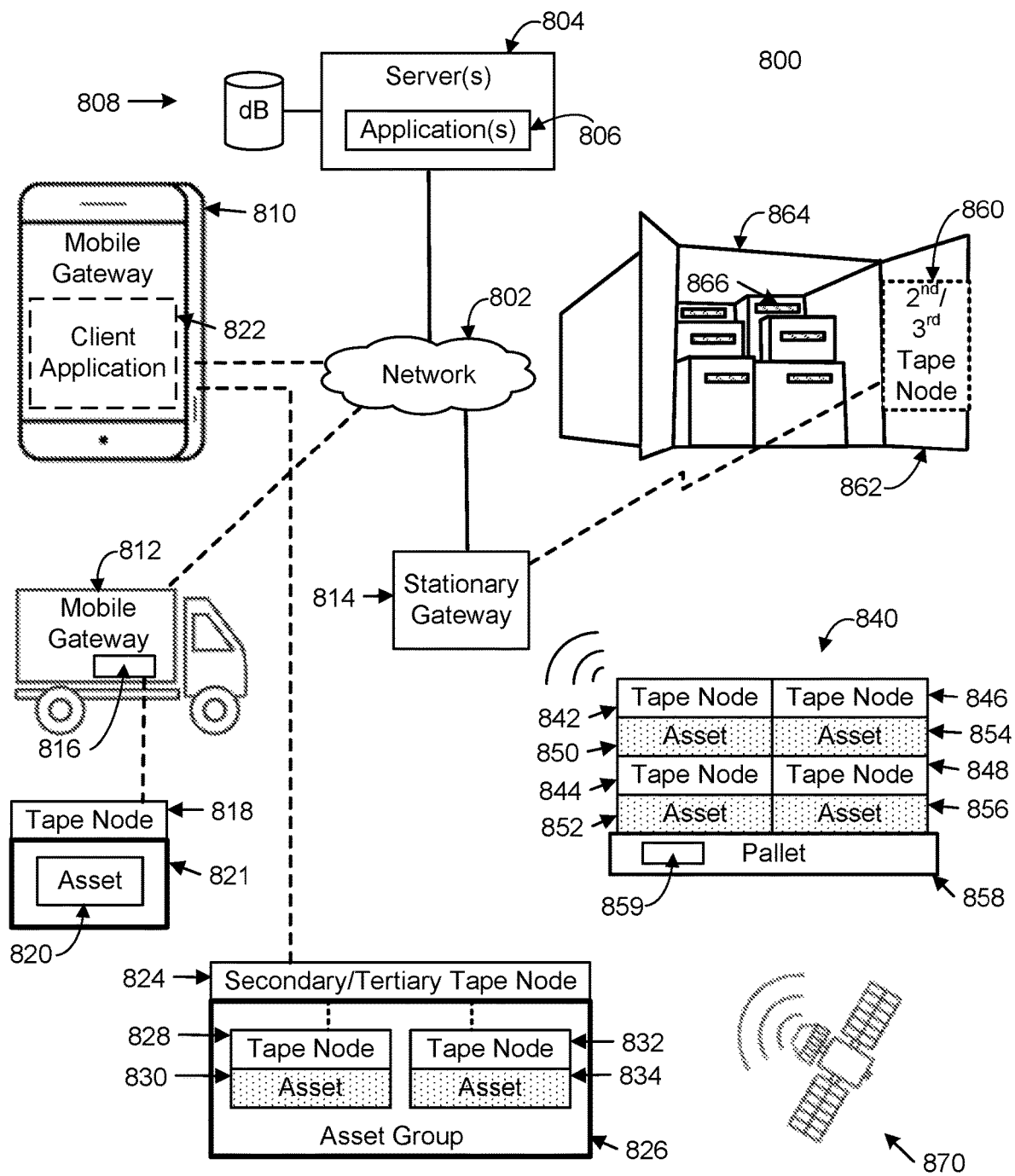
FIG. 8 is a diagrammatic view of an example of a network environment supporting communications with segments of an adhesive tape platform, according to an embodiment.

FIG. 8 shows an example network communications environment 800 (herein used interchangeably with "network 800") that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-6; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., the master agent 842-848, 859, secondary agent 824, 860, or tertiary agent 824, 860 shown in FIG. 8), where each tape node class has a different respective set of functionalities and/or capacities, as described above with respect to the "agents" in FIGS. 1-6. For example, the master agents 842-848, 859 (with reference to FIGS. 6A have a lower-power wireless communication interface (e.g., the low-power wireless-communication interface 652, with reference to FIG. 6A), in comparison to the secondary and tertiary agents 824, 860 (with reference to FIG. 6B,C).

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In some embodiments, the client application 822 is accessible to authorized users and the authorize users may have varying levels of access to data stored in the network 800. For example, an employee (e.g., border patrol agent) at a checkpoint may have more access than a non-employee user, who may be granted a temporary access for a limited purpose of tracking a particular asset during the voyage, with a final destination to the non-employee user. This limited access for the non-employee user may be to ensure a safe chain-of-custody from end-to-end, without tampering, and it may be applicable to any type of asset.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to automatically search for tape nodes (as shown in FIGS. 15A-20) and receive pings from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-748 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 408 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of an asset container 864, and is further configured to communicate with the network service 808 over the network 802. In the illustrated example, the asset container 864 contains a number of parcels labeled or sealed by respective master tape nodes 866 and containing respective assets. The secondary or tertiary tape node 860 communicates with each of the master tape nodes 866 within the asset container 864 and communicates with the stationary gateway 814. In some examples, each of the master tape nodes 866 includes a low-power wireless communications-interface (e.g., the low-power wireless-communication interface 652, with reference to FIG. 6A), and the secondary or tertiary tape node 860 includes a low-power wireless-communications interface (low-power wireless-communication interfaces 652', 652", with reference to FIGS. 6B-6C) for communicating with the master tape nodes 866 contained within the asset container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the asset container 864 are closed, the secondary or tertiary tape node 860 is operable to communicate wirelessly with the master tape nodes 866 contained within the asset container 864. In some embodiments, both a secondary and a tertiary node are attached to the asset container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the asset container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-6). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segment 670 typically adheres to objects (e.g., a parcel 826 and an asset container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9:
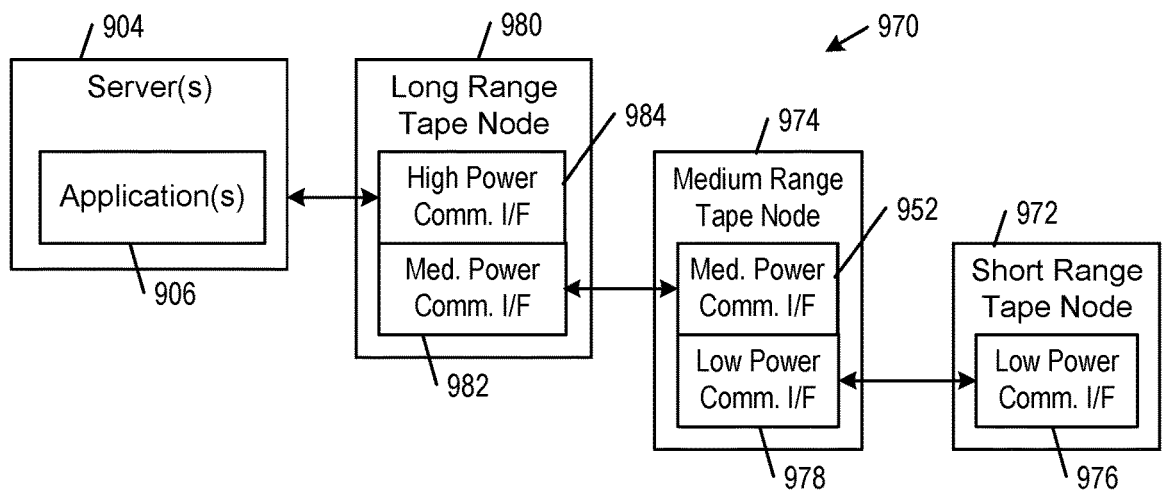
FIG. 9 is a diagrammatic view of a hierarchical communications network including an adhesive tape platform, according to an embodiment.

FIG. 9 shows an example hierarchical wireless communications network of tape nodes 970. In this example, the short-range tape node 972 and the medium range tape node 974 communicate with one another over their respective low power wireless communication interfaces 976, 978. The medium range tape node 974 and the long-range tape node 980 communicate with one another over their respective medium power wireless communication interfaces 978, 982. The long-range tape node 980 and the one or more network service servers 904 communicate with one another over the high-power communication interface 984. In some examples, the low power communication interfaces 976, 978 establish wireless communications with one another in accordance with the Bluetooth LE protocol, the medium power communication interfaces 986, 982 establish wireless communications with one another in accordance with the LoRa communications protocol, and the high-power communication interface 984 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 of the network service 908 designates a tape node at a higher level in a hierarchical communications network as a master node of a designated set of tape nodes at a lower level in the hierarchical communications network. For example, the designated master tape node may be adhered to a parcel (e.g., a box, pallet, or asset container) that contains one or more tape nodes that are adhered to one or more packages containing respective assets. In order to conserve power, the tape nodes typically communicate according to a schedule promulgated by the one or more network service servers 904 of the network service 908. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the network 800). In other examples, the master tape node processes the information contained in the received data packets and transmits the processed information to the one or more network service servers 904.

Figure 10:
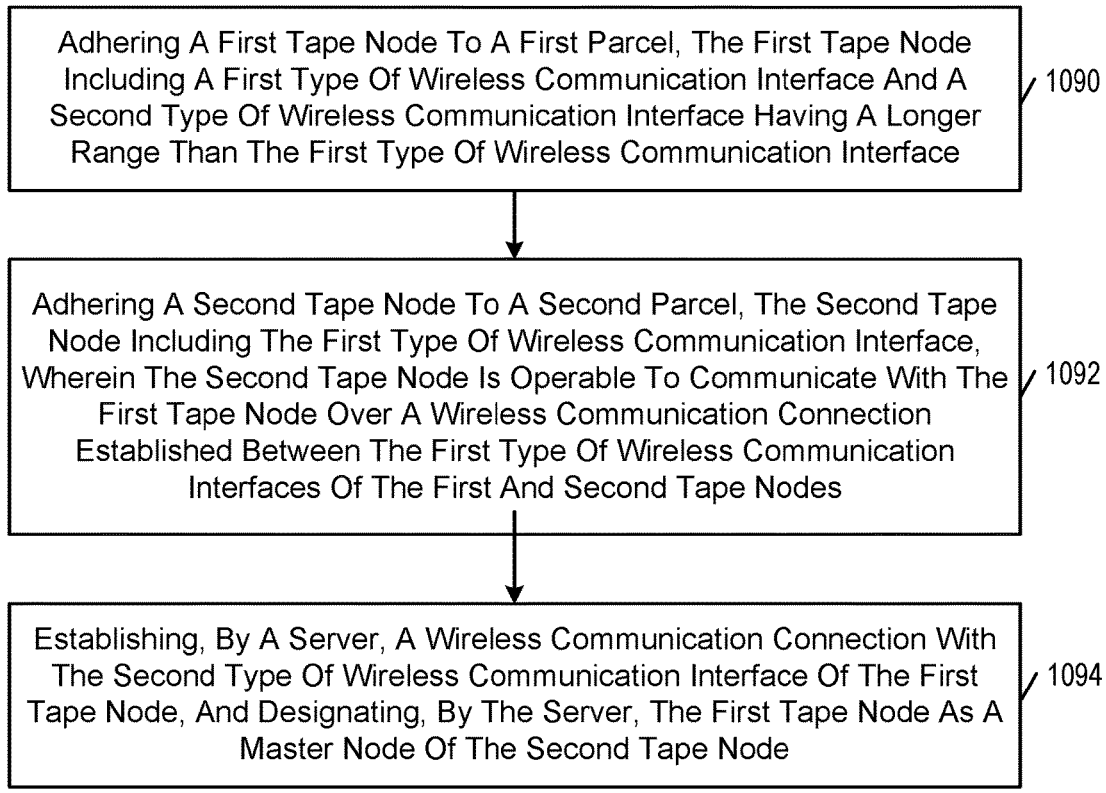
FIG. 10 is a flow diagram of a method of creating the hierarchical communications network, according to an embodiment.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 1090). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 1092). An application executing on a computer system (e.g., the one or more network service servers 904 of a network service 906) establishes a wireless communication connection with the second type of wireless communication interface of the first tape node, and the application transmits programmatic code executable by the first tape node to function as a master tape node with respect to the second tape node (FIG. 10, block 1094).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces).

A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 11A:
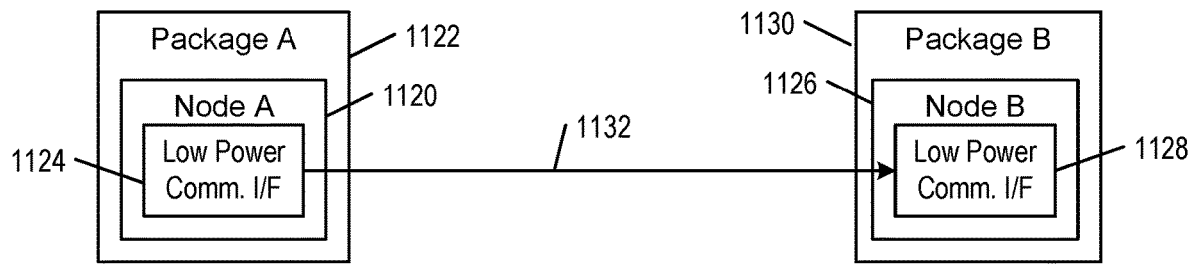
FIGS. 11A-E are diagrammatic views showing example use cases for a distributed agent operating system, according to an embodiment.

Referring to FIG. 11A, a node 1120 (Node A) is associated with a package 1122 (Package A). In some embodiments, the node 1120 may be implemented as a tape node that is used to seal the package 1122 or it may be implemented as a label node that is used to label the package 1122; alternatively, the node 1120 may be implemented as a non-tape node that is inserted within the package 1122 or embedded in or otherwise attached to the interior or exterior of the package 1122. In the illustrated embodiment, the node 1120 includes a low power communications interface 1124 (e.g., a Bluetooth Low Energy communications interface). Another node 1126 (Node B), which is associated with another package 1130 (Package B), is similarly equipped with a compatible low power communications interface 1128 (e.g., a Bluetooth Low Energy communications interface).

In an example scenario, in accordance with the programmatic code stored in its memory, node 1126 (Node B) requires a connection to node 1120 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1120 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1132 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 11B:
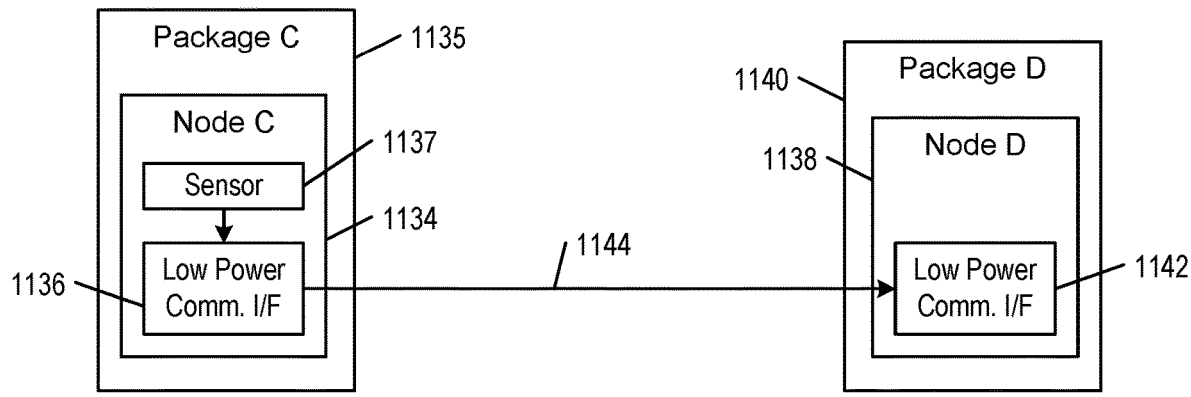

Referring to FIG. 11B, a node 1134 (Node C) is associated with a package 1135 (Package C). In the illustrated embodiment, the Node C includes a low power communications interface 1136 (e.g., a Bluetooth Low Energy communications interface), and a sensor 1137 (e.g., a temperature sensor). Another node 1138 (Node D), which is associated with another package 1140 (Package D), is similarly equipped with a compatible low power communications interface 1142 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D.

In this process, Node C and Node D determine each other's identities, capabilities, and services. For example, after successfully establishing a communication path 1144 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 11C:
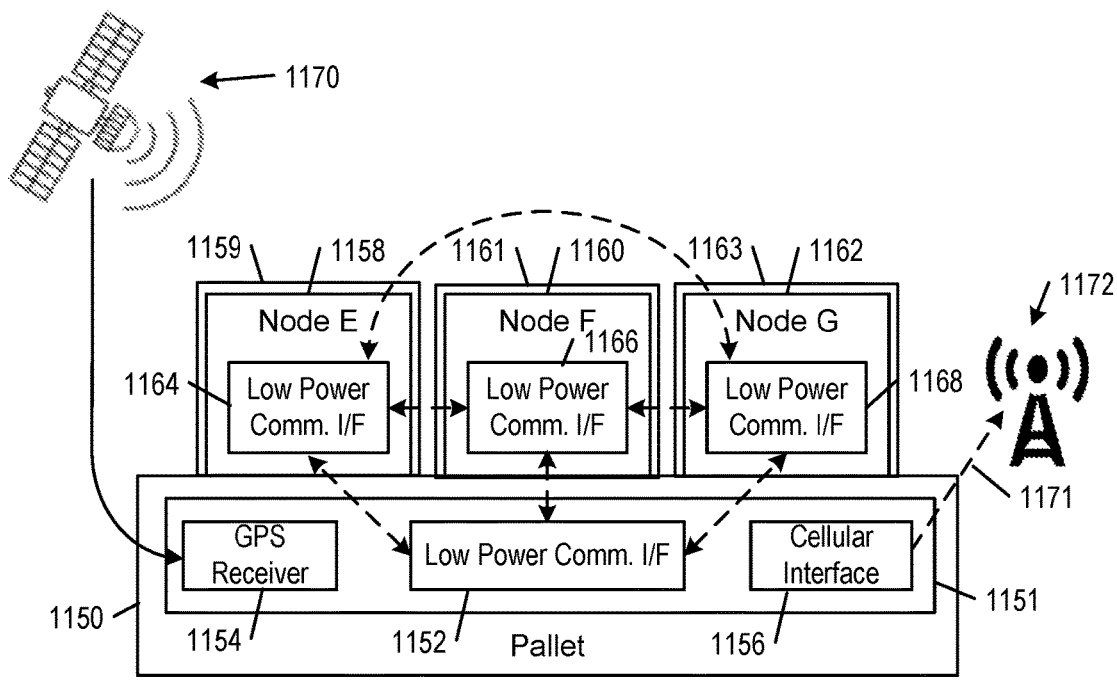

Referring to FIG. 11C, a pallet 1150 is associated with a master node 1151 that includes a low-power communications interface 1152, a GPS receiver 1154, and a cellular communications interface 1156. In some embodiments, the master node 1151 may be implemented as a tape node or a label node that is adhered to the pallet 1150. In some embodiments, the master node 1151 may be implemented as a non-tape node that is inserted within the body of the pallet 1150 or embedded in or otherwise attached to the interior or exterior of the pallet 1150.

The pallet 1150 provides a structure for grouping and containing packages 1159, 1161, 1163 each of which is associated with a respective peripheral node 1158, 1160, 1162 (Node E, Node F, and Node G). Each of the peripheral nodes 1158, 1160, 1162 includes a respective low power communications interface 1164, 1166, 1168 (e.g., Bluetooth Low Energy communications interface). In the illustrated embodiment, each of the nodes E, F, G, and the master node 1151 are connected to each of the other nodes over a respective low power communications path (shown by dashed lines).

In some embodiments, the packages 1159, 1161, 1163 are grouped together because they are related. For example, the packages 1159, 1161, 1163 may share the same shipping itinerary or a portion thereof. In an example scenario, the master pallet node 1151 scans for advertising packets that are broadcasted from the peripheral nodes 1158, 1160, 1162. In some examples, the peripheral nodes broadcast advertising packets during respective scheduled broadcast intervals. The master node 1151 can determine the presence of the packages 1159, 1161, 1163 in the vicinity of the pallet 1150 based on receipt of one or more advertising packets from each of the nodes E, F, and G. In some embodiments, in response to receipt of advertising packets broadcasted by the peripheral nodes 1158, 1160, 1162, the master node 1151 transmits respective requests to the server to associate the master node 1151 and the respective peripheral nodes 1158, 1160, 1162. In some examples, the master tape node requests authorization from the server to associate the master tape node and the peripheral tape nodes. If the corresponding packages 1159, 1161, 1163 are intended to be grouped together (e.g., they share the same itinerary or certain segments of the same itinerary), the server authorizes the master node 1151 to associate the peripheral nodes 1158, 1160, 1162 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1151 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1158, 1160, 1162 include environmental sensors for obtaining information regarding environmental conditions in the vicinity of the associated packages 1159, 1161, 1163. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1151 can determine its own location based on geolocation data transmitted by a satellite-based radio navigation system 1170 (e.g., GPS, GLONASS, and NAVSTAR) and received by the GPS receiver 1154 component of the master node 1151. In an alternative embodiment, the location of the master pallet node 1151 can be determined using cellular based navigation techniques that use mobile communication technologies (e.g., GSM, GPRS, CDMA, etc.) to implement one or more cell-based localization techniques. After the master node 1151 has ascertained its location, the distance of each of the packages 1159, 1161, 1163 from the master node 1151 can be estimated based on the average signal strength of the advertising packets that the master node 1151 receives from the respective peripheral node. The master node 1151 can then transmit its own location and the locations of the package nodes E, F, and G to a server over a cellular interface connection with a cellular network 1172. Other methods of determining the distance of each of the packages 1159, 1161, 1163 from the master node 1151, such as Received Signal-Strength Index (RSSI) based indoor localization techniques, also may be used.

In some embodiments, after determining its own location and the locations of the peripheral nodes, the master node 1151 reports the location data and the collected and optionally processed (e.g., either by the peripheral nodes peripheral nodes 1158, 1160, 1162 or the master node 1151) sensor data to a server over a cellular communication path 1171 on a cellular network 1172.

In some examples, nodes are able to autonomously detect logistics execution errors if packages that are supposed to travel together no longer travel together and raise an alert. For example, a node (e.g., the master node 1151 or one of the peripheral nodes 1158, 1160, 1162) alerts the server when the node determines that a particular package 1159 is being or has already been improperly separated from the group of packages. The node may determine that there has been an improper separation of the particular package 1159 in a variety of ways. For example, the associated peripheral node 1158 that is bound to the particular package 1159 may include an accelerometer that generates a signal in response to movement of the package from the pallet. In accordance with its intelligent agent program code, the associated peripheral node 1158 determines that the master node 1151 has not disassociated the particular package 1159 from the group and therefore broadcasts advertising packets to the master node, which causes the master node 1151 to monitor the average signal strength of the advertising packets and, if the master node 1151 determines that the signal strength is decreasing over time, the master node 1151 will issue an alert either locally (e.g., through a speaker component of the master node 1151) or to the server.

Figure 11D:
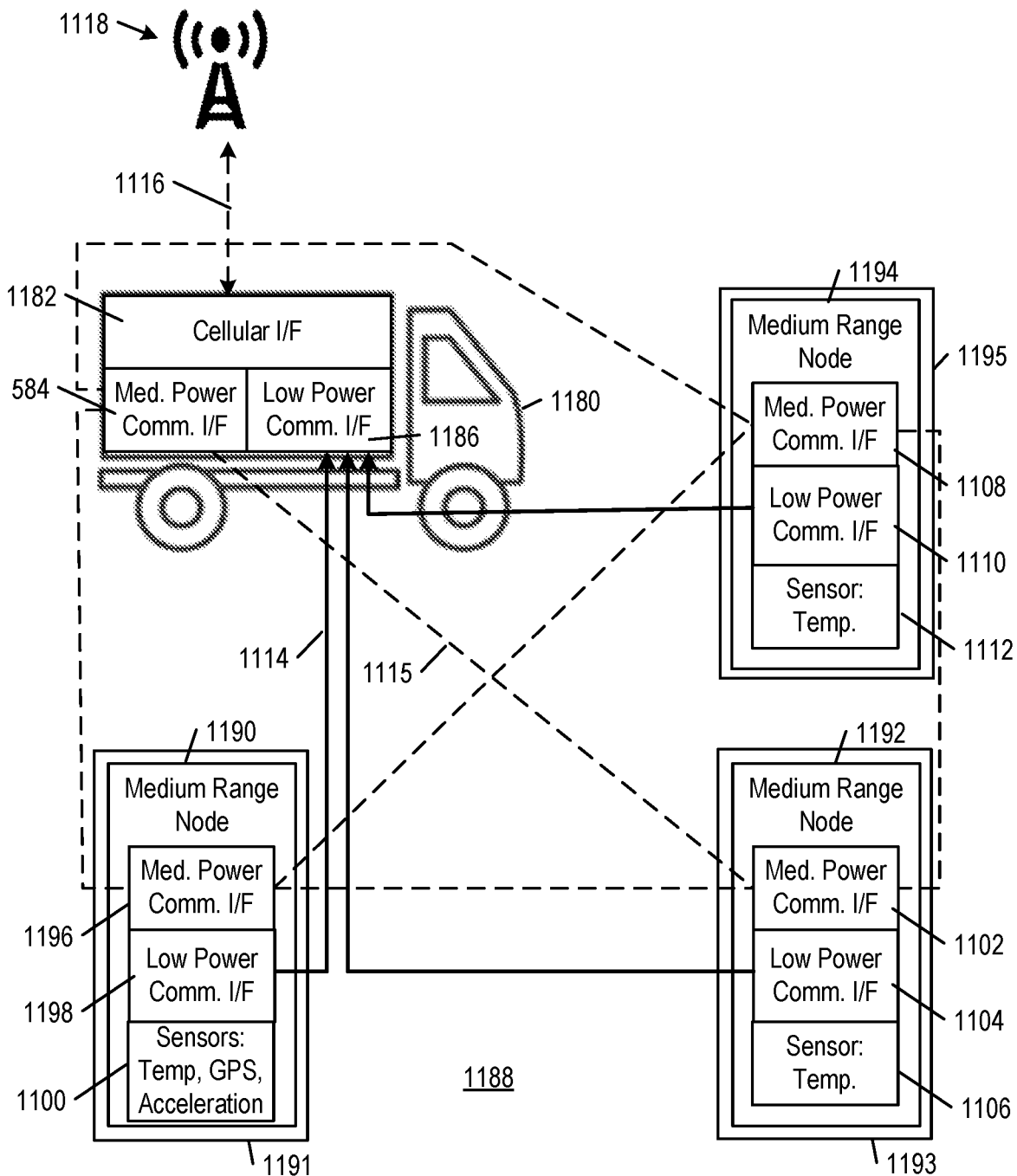

Referring to FIG. 11D, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1094 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 11E:
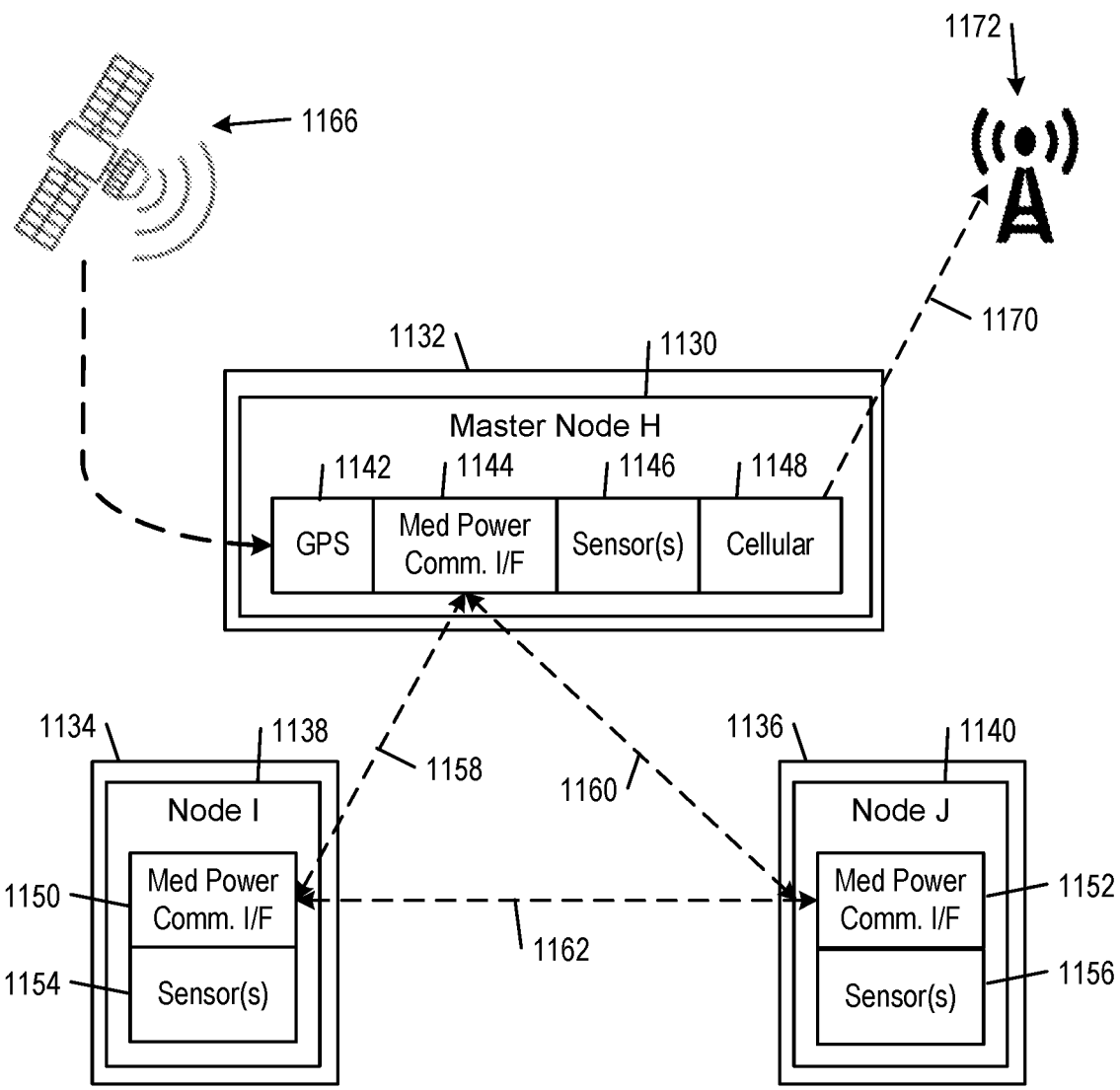

Referring to FIG. 11E, a master node 1130 is associated with a logistic item 1132 (e.g., a package) and grouped together with other logistic items 1134, 1136 (e.g., packages) that are associated with respective peripheral nodes 1138, 1140. The master node 1130 includes a GPS receiver 1142, a medium power communications interface 1144, one or more sensors 1146, and a cellular communications interface 1148. Each of the peripheral nodes 1138, 1140 includes a respective medium power communications interface 1150, 1152 and one or more respective sensors 1154, 1156. In the illustrated embodiment, the peripheral and master nodes are connected to one another other over respective pairwise communications paths (shown by dashed lines). In some embodiments, the nodes 1130, 1138, 1140 communicate through respective LoRa communications interfaces over LoRa formatted communications paths 1158, 1160, 1162.

In the illustrated embodiment, the master and peripheral nodes 1130, 1138, 1140 include environmental sensors for obtaining information regarding environmental conditions in the vicinity of the associated logistic items 1132, 1134, 1136. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1130 periodically broadcasts advertising packets in the surrounding area. When the peripheral nodes 1138, 1140 are within range of master node 1130, and are operating in a listening mode, the peripheral nodes 1138, 1140 will extract the address of master node 1130 and potentially other information (e.g., security information) from the advertising packets. If, according to their respective programmatic code, the peripheral nodes 1138, 1140 determine that they are authorized to connect to the master node 1130, the peripheral nodes 1138, 1140 will attempt to pair with the master node 1130. In this process, the peripheral nodes 1138, 1140 and the master node 1130 determine each other's identities, capabilities, and services. For example, after successfully establishing a respective communication path 1158, 1160 with each of the peripheral nodes 1138, 1140 (e.g., a LoRa formatted communication path), the master node 1130 determines certain information about the peripheral nodes 1138, 1140, such as their identity information (e.g., peripheral nodes), their capabilities (e.g., measuring temperature data), and their services include transmitting temperature data to other nodes.

After establishing LoRa formatted communications paths 1158, 1160 with the peripheral nodes 1138, 1140, the master node 1130 transmits requests for the peripheral nodes 1138, 1140 to transmit their measured and/or locally processed temperature data to the master node 1130.

In the illustrated embodiment, the master node 1130 can determine its own location based on geolocation data transmitted by a satellite-based radio navigation system 1166 (e.g., GPS, GLONASS, and NAVSTAR) and received by the GPS receiver 1142 component of the master node 1130. In an alternative embodiment, the location of the master node 1130 can be determined using cellular based navigation techniques that use mobile communication technologies (e.g., GSM, GPRS, CDMA, etc.) to implement one or more cell-based localization techniques. After the master node 1130 has ascertained its location, the distance of each of the logistic items 1134, 1136 from the master node 1130 can be estimated based on the average signal strength of the advertising packets that the master node 1130 receives from the respective peripheral node. The master node 1130 can then transmit its own location and the locations of the package nodes H, J, and I to a server over a cellular interface connection with a cellular network 1172. Other methods of determining the distance of each of the logistic items 1134, 1136 from the master node 1130, such as Received Signal-Strength Index (RSSI) based indoor localization techniques, also may be used.

In some embodiments, after determining its own location and the locations of the peripheral nodes, the master node 1130 reports the location data, the collected and optionally processed (e.g., either by the peripheral nodes peripheral nodes 1138, 1140 or the master node 1130) sensor data to a server over a cellular communication path 1170 on a cellular network 1172.

Conventional systems of fleet management, to determine a load status of an asset container, may use a camera with computer vision coupled with artificial intelligence. Further, conventional systems require computations to be performed remotely from where data is collected, requiring high-volume data transfers to/from satellites. These conventional systems may determine how many assets are inside an asset container, as well as which assets are inside the truck. However, there are many fallbacks to this conventional approach, including high data-transfer volume, reliance on existing cellular communications/connections, cameras are limited to implementing 2D images, live video not being practical because of the high data-transfer volume, and requiring a dedicated satellite system is required for communication.

Figure 12A:
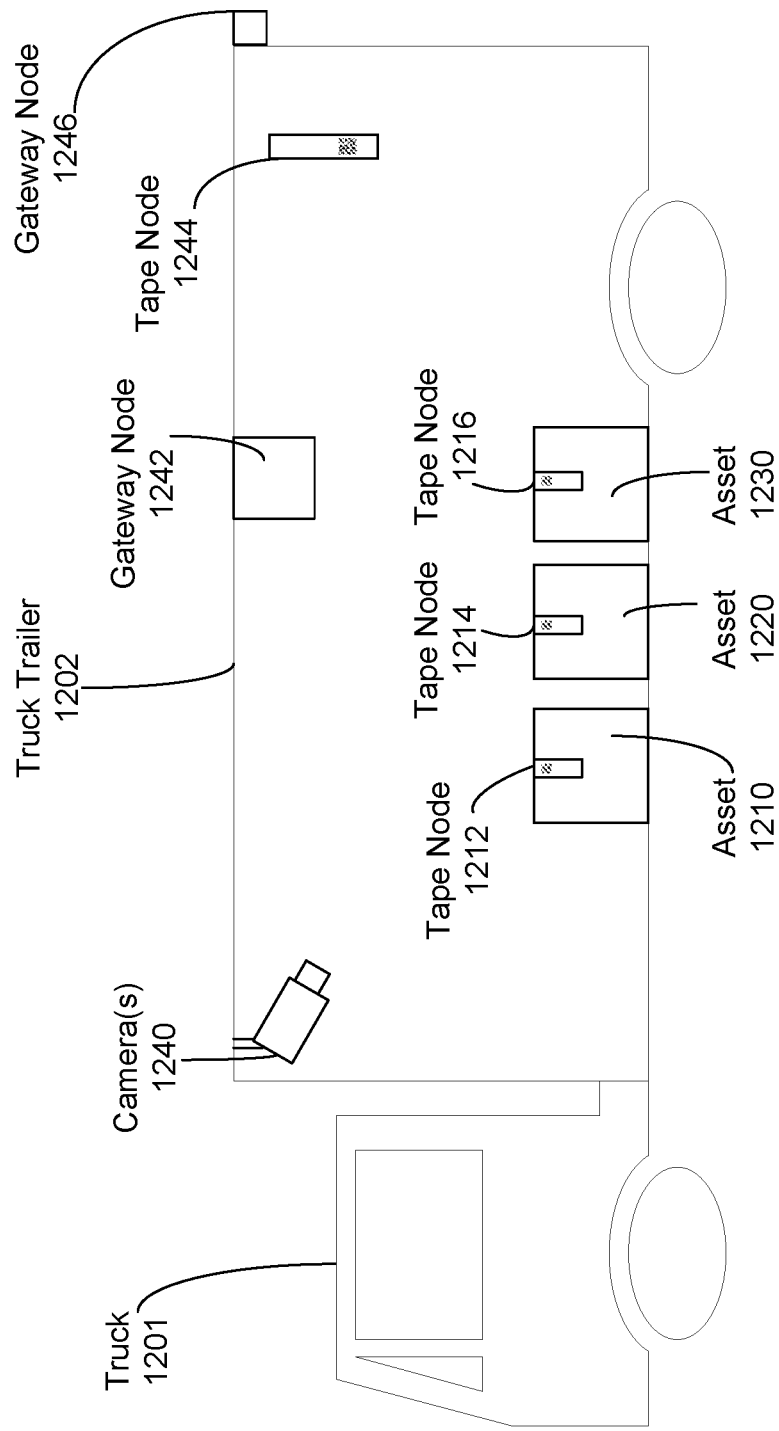
FIG. 12A-G are schematic diagrams showing components of a truck, including assets with associated tape nodes, that are used to perform 3D vision and analysis of the loading of the truck, according to some embodiments.
Figure 12C:
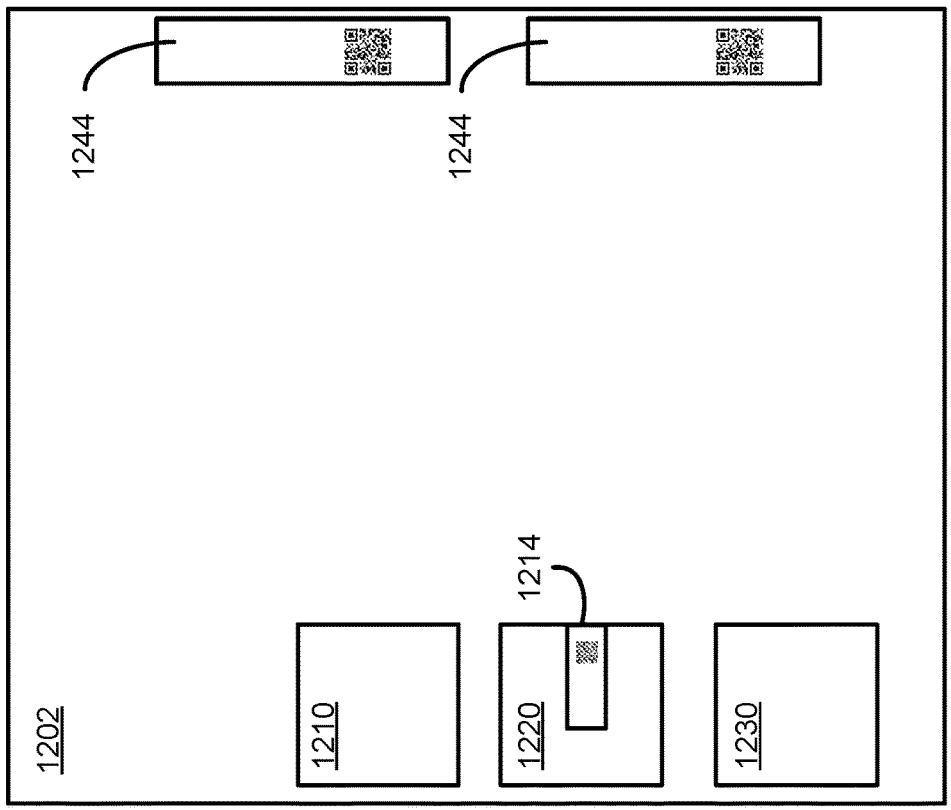
Figure 12B:
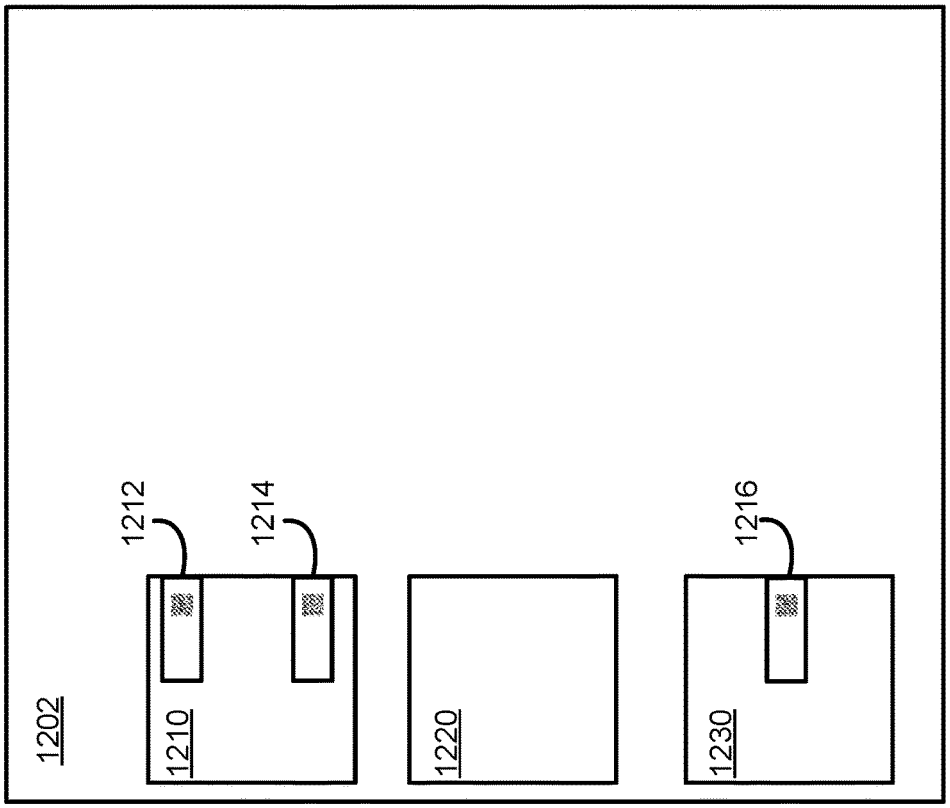
Figure 12E:
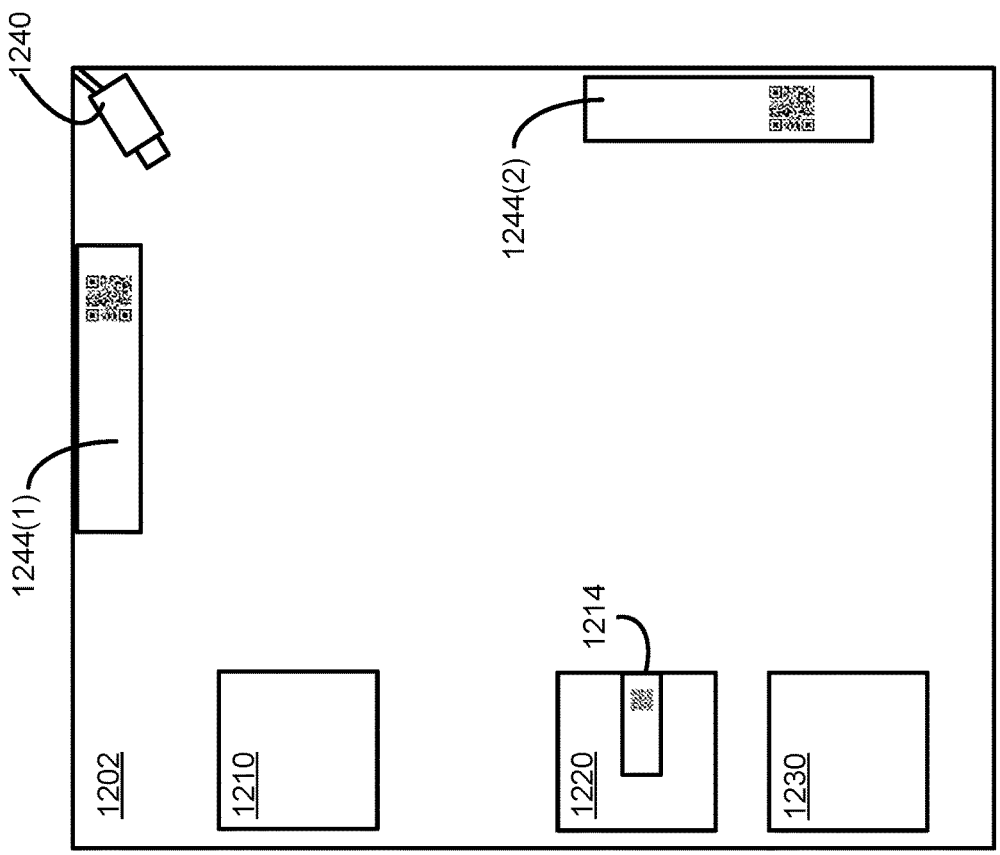
Figure 12D:
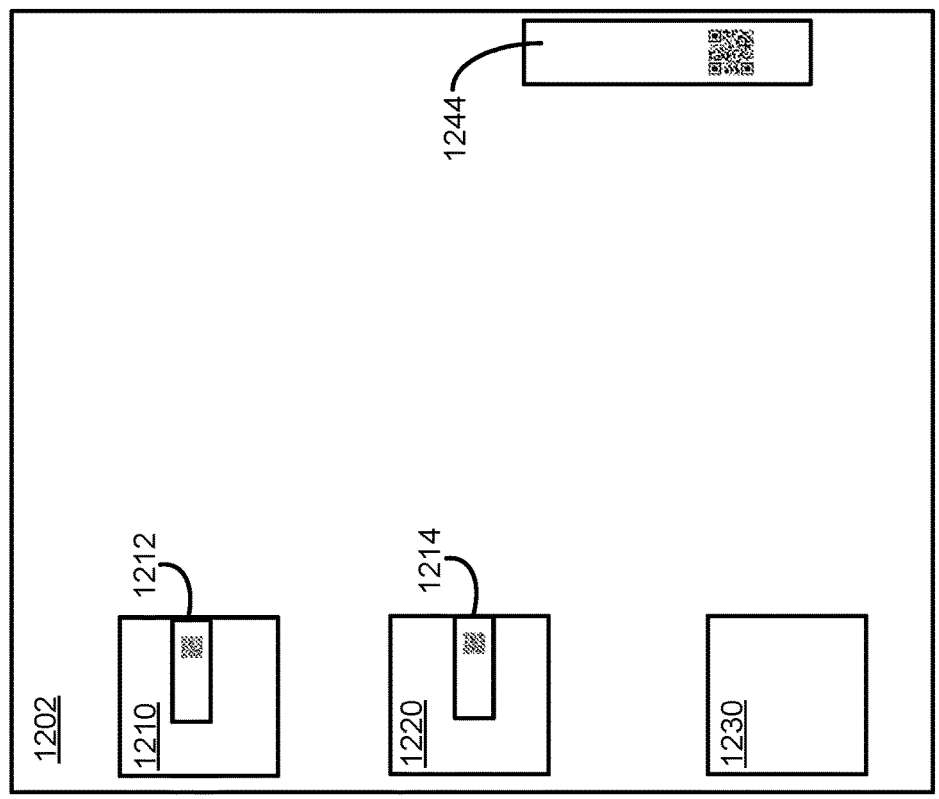
Figure 12G:
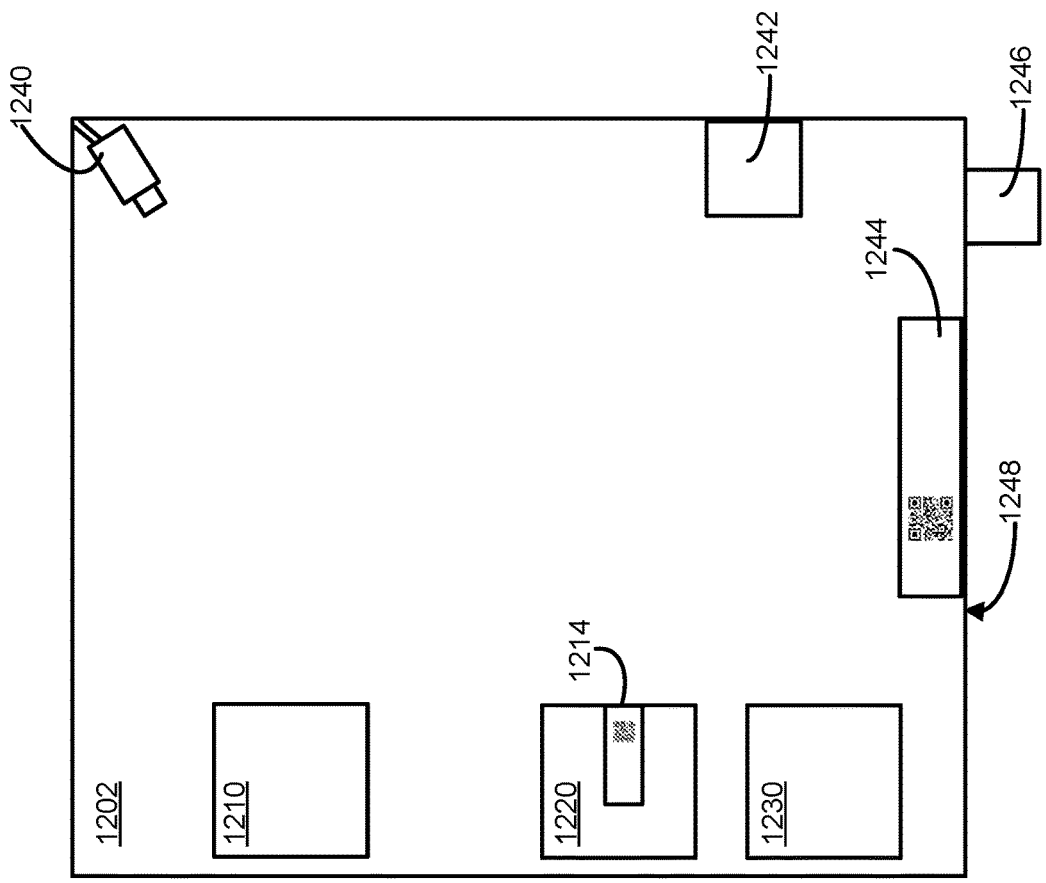
Figure 12F:
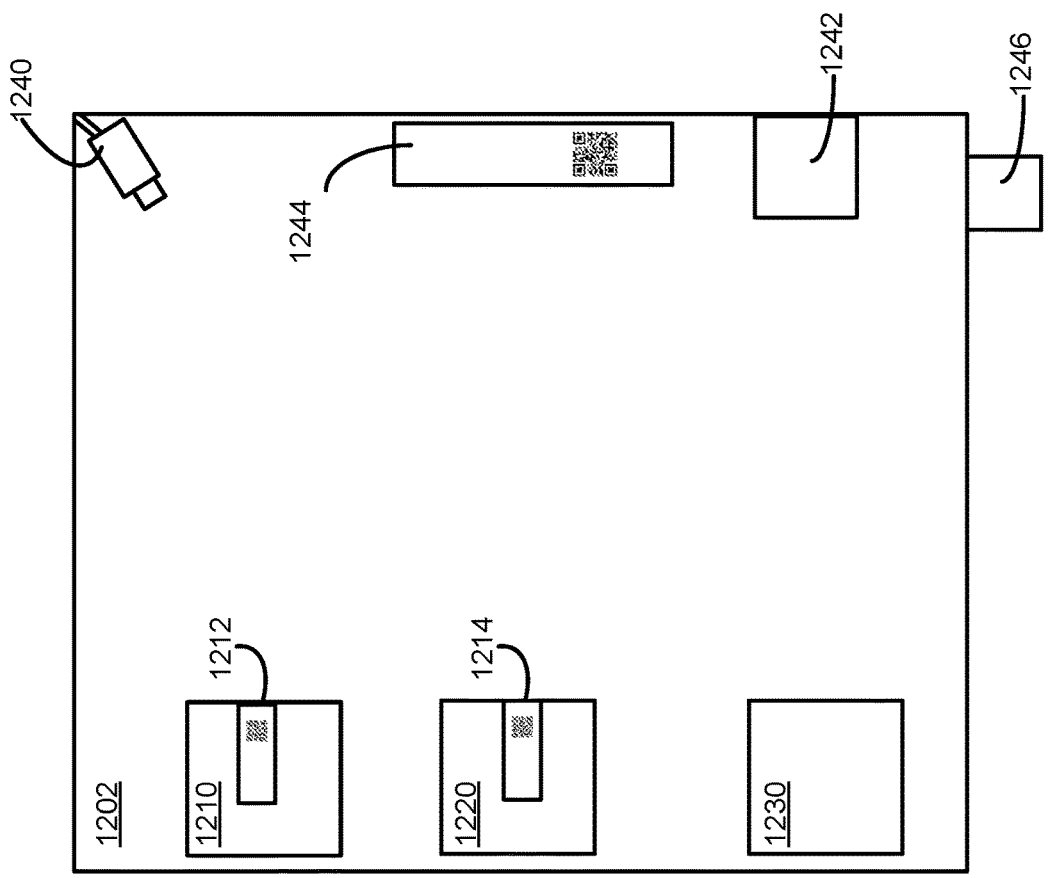
Figure 13:
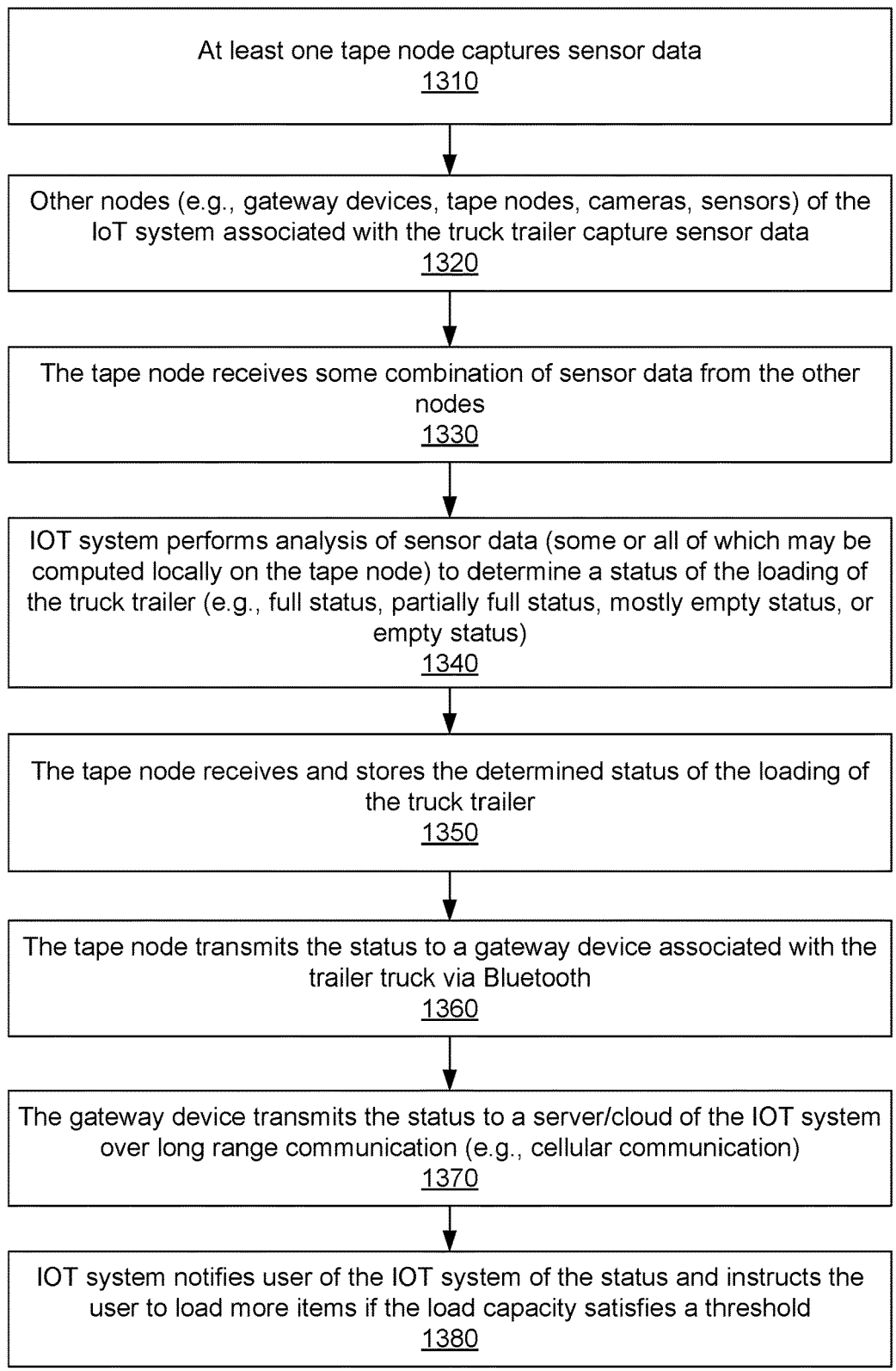
FIG. 13 is flow chart showing one example method for determining a loading status of a truck trailer using a tape node, according to some embodiments.

Advantageously, FIGS. 12 and 13 provide a method and system for using nodes placed throughout an asset container (e.g., a truck trailer, a shipping container, air-cargo container, train cargo, etc.) to perform 3D vision techniques (used interchangeably with "computer vision techniques"), locally, to determine a load status of the asset container. The data collection and the 3D vision computations are performed locally at one of the nodes within the asset container. In embodiments, two or more nodes may collect the data and then transmit the data for computation to a gateway node. The nodes may be adhered to assets or walls on the inside of the truck trailer, as illustrated in FIG. 12. The determined load status may be transmitted to a client device (e.g., the mobile gateway 810), accessible by a mobile application (e.g., the mobile application 822). In some embodiments, alternatively, or in combination with 3D vision techniques, one or more of the tape nodes may have time-of-flight sensors or infrared sensors for determining the load status of the asset container.

FIG. 12A is a diagram showing an example a truck 1201 and trailer 1202 with components for performing 3D vision and analysis of a quantity of assets 1210, 1220, 1230 loaded within the truck 1201. The assets 1210, 1220, and 1230 are each configured with an associated tape node 1212, 1214, and 1216, respectively. In the example of FIG. 12A, the components include a camera 1240, a first gateway node 1242, a tape node 1244, and a second gateway node 1246. In some embodiments, one or more of the tape nodes 1212, 1214, 1216, 1244 may have an embedded camera and/or an optical sensor. The components are part of an IOT system that determines whether the truck has been fully loaded, partially loaded, or is not loaded based on sensor data captured by some combination of the tape nodes 1212, 1214, 1216, the tape(s) node 1244 adhered to a surface of the truck, camera(s) 1240, and gateway nodes 1242, 1246.

In some embodiments, the tape node 1244 that includes an embedded camera and/or the camera(s) 1240 is a dedicated sensor/emitter. In some embodiments, the camera(s) 1240 and/or the tape node 1244 each has two or more embedded cameras, positioned/oriented at different points within the camera(s) 1240 and/or tape node 1244, and each of the camera(s) 1240 and/or the tape node 1244 is operable to solely perform stereoscopic 3D, multi-scopic 3D, etc. The camera 1240 mounted inside the trailer communicates with the tape nodes 1212, 1214, 1216 on the assets 1210, 1220, 1230 or tape nodes associated with the trailer. The sensor data may include 3D vision data (e.g., 3D video data) that is generated based on live video (e.g., live feed) or images that are captured from different perspectives (e.g., stereoscopic 3D or multi-scopic 3D). The sensor data is used to determine how full the truck trailer 1202 is to aid a user in managing the loading of the truck 1201. The tape nodes may communicate with gateway devices 1242, 1246 that are built into the infrastructure of the truck trailer 1202 for long-range communication with other nodes of the IOT system 800 (e.g., mobile gateway 812, stationary gateway 814, server 804, etc.). Each of the tape nodes shown in FIG. 12 may include some combination of a camera, an optical sensor, a time-of-flight sensing system, IR sensors, a structured light sensing system, or some other type of sensor system that can be used to determine the loading state of the truck 1201. Any of the tape nodes 1212, 1214, 1216, 1244, camera(s) 1240, gateway nodes 1242, 1246, may be positioned at any location within and/or outside the truck trailer 1202. The disclosed embodiments automate the positioning of the tape nodes and reduces the cost of doing so. Further, the disclosed embodiments simplify deployment of the tape nodes by using tape nodes that are already attached to the assets being transported for tracking purposes.

FIGS. 12B and C are diagrams illustrating two example scenarios for using two tape nodes of FIG. 12A to determine a 3D image using stereoscopy. FIGS. 12B and C show two tape nodes 1212, 1214 and 1244(1), (2), respectively, adhered to a single surface (wall, asset, etc.) within the truck trailer 1202 of FIG. 12A. Both FIGS. 12B and 12C illustrate two tape nodes (e.g., 1212, 1214, FIG. 12B, and 1244(1), (2), FIG. 12C) used to perform stereoscopy to determine a 3D image of the truck, which may be used to determine the truck trailer capacity (e.g., the determined status, discussed with reference to FIG. 13). The two tape nodes are adhered to a single surface, with a predetermined or fixed distance space between the tape nodes. In the example of FIG. 12B, tape nodes 1212, 1214 are adhered to asset 1210. In the example of FIG. 12B, the tape nodes 1244(1) and 1244(2) are adhered to the inside of the truck trailer 1202. In each scenario, the tape nodes 1212, 1214 and 1244(1), (2) are spaced a fixed distance apart. For example, the tape nodes 1212, 1214 may be spaced 8 inches apart and the tape nodes 1244(1), (2) may be spaced 10 inches apart.

In some embodiments, the tape nodes include embedded cameras. As shown in FIG. 12B, both tape nodes 1212, 1214 are installed on the same side of asset 1210 such that the cameras positioned 8 inches apart. The two tapes collaborate to synchronously capture images for the stereoscopy. For example, each tape node 1212, 1214, 1244(1), and 1244(2) includes computer program instructions within each memory 658, 658', 658" of the tape nodes, that when executed by the processor 650, 650', 658", coordinate the tape nodes to capture images simultaneously). The tape nodes may synchronize with each other or may be controlled by a third tape node 1216 (FIG. 12B), 1214 (FIG. 12C). For example, the tape nodes 1212, 1214 or 1244(1), (2) communicate with each other and agree on a time, via their internal clocks (e.g., clocks 654, 654', 654"), of when to begin capturing an image. For example, the tape nodes 1212, 1214 or 1244(1), (2) agree to capture images once a day at a specific time. In some embodiments the third tape node 1216, 1214 instructs the tape nodes 1212, 1214, 1244(1), 1244(2) to capture the images and constructs the 3D image therefrom. For example, the third tape node determines, using its internal clock, to transmit, to the tape nodes, an instruction to capture images at a specific time. The instruction may be periodically (e.g., every three hours), daily, etc.

FIGS. 12D and E illustrate example scenarios where the tape nodes 1212, 1214, and 1244(1), (2) are located on different surfaces (e.g., of assets in FIG. 12D and of walls of the truck trailer 1202 in FIG. 12E). In the example of FIG. 12D, tape node 1212 is on a surface of asset 1210 and tape node 1214 is on a surface of asset 1220. Each tape node 1212, 1214 includes an embedded camera and collaborate to synchronously capture images for the stereoscopy. For example, each tape node 1212, 1214 include computer program instructions within each memory 658, 658', 658" of the tape nodes, that when executed by the processor 650, 650', 658", coordinate the tape nodes to take pictures at the same time). The tape nodes can synchronize to each other or be controlled by a third tape node 1244. In some embodiments, the third tape node 1244 instructs the tape nodes 1212 and 1214 to capture the images and constructs the 3D image therefrom. In some embodiments, in FIGS. 12B-G, a specific position of the tape nodes 1212, 1214, 1244(1), (2), or the camera 1240, capturing the images, may be required. For example, the position of the tape nodes may be such that the camera view includes a majority of the asset container. Further, the cameras of the tape nodes 1212, 1214, 1244(1), (2) and camera 1240 may require a specific orientation with respect to each other. For example, the cameras on two of the tape nodes and/or camera may be orthogonal, parallel, or some other angle, with respect to each other.

In the example of FIG. 12E, tape node 1244(1) is on a first wall of the truck trailer 1202 and tape node 1244(2) is on a second wall of truck trailer 1202. Each tape node 1244(1), 1244(2) includes an embedded camera and collaborates to synchronously capture images for the stereoscopy. For example, each tape node 1244(1), 1244(2) may include computer program instructions within each memory 658, 658', 658" of the tape nodes, that when executed by the processor 650, 650', 658", coordinate the tape nodes to take pictures at the same time). The tape nodes may synchronize to each other or may be controlled by a third tape node 1214 adhered to asset 1220. In some embodiments, the third tape node 1214 instructs the tape nodes 1244(1) and 1244(2) to capture the images and constructs the 3D image therefrom. In embodiments, the camera 1240 may assist one or both of tape nodes 1244(1), 1244(2) in capturing images used for the stereoscopy.

In certain embodiment, the tape nodes 1212, 1214, 1244(1), 1244(2) use radio signal strength indicator (RS SI) to determine their distance from each other. For example, the tape nodes 1212, 1214 in FIG. 12D may use RSSI to determine their distance from each other, and the tape nodes 1244(1), (2) in FIG. 12E may use RS SI to determine their distance from each other. The tape nodes 1212, 1214, 1244(1), (2) may each include orientation sensors for determining their respective, relative orientations within the truck trailer 1202. In addition, the tape nodes 1212, 1214, and the tape nodes 1244(1) and 1244(2), respectively, coordinate image capture to be synchronous. For example, the tape nodes 1212, 1214, 1244(1), (2) have computer program instructions stored within their memory 658, 658', 658", when executed by their processors 650, 650', 650" to coordinate their image capture synchronously.

In certain embodiments, the tape nodes 1212, 1214, and the tape nodes 1244(1) and 1244(2) may use triangulation, with each other and/or with one or more other tape nodes or gateways (e.g., gateways 1242, 1246) or the camera 1240, that are in fixed locations in the truck trailer 1202, to determine their relative locations.

FIG. 12F illustrates an alternate scenario where tape nodes 1212, 1214, 1244 are located on unknown surfaces and where the camera 1240 is one of the devices used to capture images for determining load status, as discussed in FIGS. 12A E. The tape nodes 1212, 1214, 1244 collaborate to determine their relative positions and orientations of their cameras to determine the cameras are in an acceptable position to capture an image that can be correctly used for the computer vision techniques to determine the status load. The tape nodes may select specific tape nodes that are in an acceptable position to capture images for stereoscopy. For example, a camera of a tape node on an asset positioned underneath other assets may have the camera blocked by the other assets, and therefore the tape node is unable to capture images useful for stereoscopy. Where an asset is located in the middle of the trailer 1202, a camera of the tape node attached to the asset may only capture a portion (e.g., half) of the truck and is therefore less useful in determining an accurate load status of the truck trailer 1202. Similarly, where an asset is loaded into the trailer 1202 with a camera of the attached tape node facing the ground, the tape node cannot capture images useful for the 3D imaging. Accordingly, the tapes nodes 1212, 1214, 1244, and camera 1240 may collaborate, with each other and the gateways 1242, 1246, to determine which of the tape nodes are best positioned and oriented for capturing images useful for stereoscopy.

FIG. 12G illustrates an example scenario where the tape node 1244, with an embedded camera or stereoscopic camera, is adhered to a rear door 1248 of the truck trailer 1202. In some embodiments, the tape node 1244 uses and embedded vibration and/or acceleration sensors to detect opening and closing of the rear door 1248. In one example of operation, the tape node 1244 detects when the rear door 1248 is opening or is closing, captures a 3D image using the embedded camera or stereoscopic camera in response thereto, and analyzes the 3D image to determine a loading state of the truck trailer 1202. In the scenario of FIG. 12G, the tape nodes 1214, 1244, camera 1240, and gateway nodes 1242, 1246 that may each receive a notification, from the tape node 1244 when the rear door 1248 is closed or opened, to begin capturing and analyzing images (e.g., performing stereoscopy) to determine the load status of the truck trailer 1202. For example, the notification is send after a predetermined period (e.g., ten minutes, twenty minutes, etc.) of the tape node 1244 detecting, using the accelerometer or a vibration sensor, by either collected acceleration or vibration data exceeding a threshold, the door closing and/or the truck trailer 1202 accelerating, or an engine of the truck 1201, vibrating due to starting.

In the embodiments of FIGS. 12A-G, only one tape node 1212, 1214, 1216, 1244(1), (2), or the camera 1240 may be used to perform the computer vision techniques (e.g., stereoscopy or time of flight) and a second tape node or camera or multiple tape nodes and/or gateways 1242, 1246 may be used to perform the computer vision techniques to generate the load status of the asset container (e.g., truck trailer 1202). In some embodiments, the camera 1240 may be rotatable to capture multiple images at different angles. In some embodiments, the tape nodes 1244(1), (2), and gateways 1242, 1246 and/or the camera may be dedicated sensors/cameras that are permanently adhered to the asset container. Further, in the embodiments illustrated in FIGS. 12A-G, the tape nodes 1212, 1214, 1244(1), (2), and gateways 1242, 1246 and/or the camera 1240 may include any one of a time-of-flight sensor, an IR sensor (for IR depth sensing), optical sensors, a light emitter (e.g., an IR or visible light emitter, such as the IR display 1410), and may be equipped to communicate with each other using their low-power wireless-communication interfaces (e.g., Bluetooth). In some embodiments, a tape node 1212, 1214, 1244(1), (2), and gateways 1242, 1246 and/or the camera may be on each wall, ceiling, and floor on the interior of the truck trailer 1202. In some embodiments, the before the computer vision techniques are performed, the tape nodes 1212, 1214, 1244(1), (2), and gateways 1242, 1246 and/or the camera 1240 may create a baseline, using one or more of the cameras embedded within any of the 1212, 1214, 1244(1), (2), and gateways 1242, 1246 to calibrate/self-calibrate to remove any noise. For example, the tape nodes 1212, 1214, 1244(1), (2), and gateways 1242, 1246 and/or the camera 1240 may use a structured light source within the truck trailer 1202 or an embedded light or IR light to calibrate. For example, the tape nodes 1212, 1214, 1244(1), (2), and gateways 1242, 1246 and/or the camera 1240 may use embedded time-of-flight sensors to calibrate/self-calibrate.

FIG. 13 illustrates a flow chart showing an example method 1300 of determining a loading status of a truck trailer using a tape node(s), according to some embodiments. The loading status may be determined using various optical techniques, such as stereoscopic 3D, multi-scopic 3D, IR depth sensing, time-of-flight, etc. In some embodiments, some or all of the optical techniques are implemented to determine the loading status of the asset container. In some embodiments, method 1300 is discussed in the context of example illustration of FIG. 12; however, method 1300 may apply to any asset container, e.g., an air-cargo container, a train container, shipping container, and/or any storage container at a shipping facility, manufacturing center, etc.

Method 1300 includes at least one tape node (e.g., a tape node 1212, 1214, 1216, and/or 1244), gateway device 1242, 1246, and/or camera 1240) capturing (1310) data (e.g., optical data, etc.) using one or more sensors (e.g., IR sensor, time-of-flight sensor, optical sensor, etc.). The number of nodes capturing data may depend on the data collection and type of analysis (e.g., using time-of-flight sensor data, stereoscopic 3D, multi-scopic 3D, etc.) performed. In some embodiments, the tape node is adhered to an asset loaded within an asset container (e.g., a shipping container, a truck trailer 1202, a cargo container of a plane, etc.). In some embodiments, at least one tape node 1244 is attached to an inner wall of the truck trailer 1202.

Method 1300 includes at least one other node (e.g., a tape node 1212, 1214, 1216, 1244, gateway device 1242, 1246, camera 1240, etc.) of the IOT system 800 associated with the truck trailer 1202 capturing (1320) sensor data. In some embodiments, the sensor data may include optical data collected from a second sensor of the at least one other tape node, from step 1310. For example, in step 1310, at least one tape node captures sensor data using a first camera and, in step 1320, the at least one tape node captures sensor data using a second camera.

In some embodiments, capturing data in steps 1310, 1320 may occur once per day, or at some other predetermined time interval (e.g., every three hours, four hours, every other day, etc.) or at predetermined locations (e.g., checkpoints, such as shipping facilities or border crossings, etc.). The load within the trailer 1202 may only change at specific times, such as when the truck trailer 1202 doors open or close, or when the trailer 1202 enters certain areas, such as shipping facilities. While the truck trailer 1202 is in transit, and while the rear door 1248 has not been opened, it is unlikely that the load in the trailer 1202 changes. Accordingly, a battery of each tape node is conserved by reducing the frequency with which the tape nodes check the loading state of the trailer 1202. When the camera 1240 is line-powered, the camera 1240 may take images, record video, and/or still images at a higher frequency, but the necessity to analyze the images, recorded video, or still images to determine the loading state is based on specific instances of when the load changes. In some embodiments, as in FIG. 12G, the tape node 1244 is attached to the rear door of the truck trailer and, when the wireless sensing system 800 detects an event that could result in a change to the loading state, such as the tape node 1244 detecting that the rear door 1248 opening and/or that something entering through the rear door 1248, the tape node 1244 may perform the loading state check.

In some embodiments, capturing data depends on battery life of nodes. For example, to preserve battery power, the nodes that capture data may rotate time intervals for capturing sensor data; or the time interval of capturing data may increase as batter power decreases (e.g., from once every day to once every two days). In some embodiments, the time interval may depend on a shipping manifest. For example, if the mode of transportation is slow (e.g., train or ship), the time interval may be set for when the asset container is at a checkpoint or once throughout a journey.

Method 1300 further includes any of the tape nodes (e.g., tape nodes 1212, 1214, 1216, 1244, gateway device 1242, 1246, camera 1240, etc. of the IOT system 800 associated with the truck trailer 1202) receiving (1330) sensor data from any of the other tape nodes that captured the sensor data in steps 1310, 1320. Method 1300 further includes any of the tape nodes or the other nodes performing analysis (1340), locally, on the received sensor data, to determine a status of the truck trailer 1202 (e.g., e.g., full status, partially full status, mostly empty status, or empty status). In some embodiments, the analysis or a portion of the analysis may be performed remotely by, e.g., the server 804. In some embodiments, the analysis may include using 3D-vision techniques to create a 3D model of the truck trailer 1202, and then determine the load status (capacity remaining for additional assets) of the truck trailer 1202. For example, any of the nodes (e.g., a tape node 1212, 1214, 1216, 1244, gateway device 1242, 1246, camera 1240, etc.) may, locally, determine a capacity percentage (e.g., 30%, 50%, 75%, full, etc.) of the truck.

Method 1300 includes some combination of the tape nodes 1212, 1214, 1216, 1244 and gateway devices 1242, 1246 receiving and/or storing (1350) the determined status of the truck trailer 1202. For example, any node (either tape node or gateway device) involved in the calculation of the load status may store the calculation locally and/or transmit the load statues to other nodes. In one example of block 1350, the receiving and/or storing may be in response to some combination of the tape nodes 1212, 1214, 1216, 1244 and gateway devices 1242, 1246 broadcasting the determined status. Method 1300 further includes the tape nodes 1212, 1214, 1216, 1244 transmitting (1360) the determined status to a gateway device 1242, 1246 via Bluetooth. In some embodiments, the tape nodes 1212, 1214, 1216, 1244 broadcast the determined status to the camera 1240. In some embodiments, the tape nodes 1212, 1214, 1216 attached to assets 1210, 1220, 1230 broadcast the determined status to gateway device 1246 located exterior to the trailer. In some embodiments, the tape nodes 1212, 1214, 1216 attached to assets 1210, 1220, 1230 broadcast the determined status to gateway device 1242 attached to an inner wall of the trailer.

In one example of block 1360, a gateway (e.g., mobile gateway 810, 812, or stationary 814) located at a loading dock, shipping facility, warehouse, factory, etc., may receive the determined status of the truck trailer 1202. The gateway may then transmit the determined status to the server 804 or a local computer system. The server 804, or the local computer system, may additionally store information on the truck 1201 (e.g., shipping manifest, route, next destination, previous destinations, etc.), information on which tape nodes 1212, 1214, 1216, gateway nodes 1242, 1246, etc., are on the truck 1201, and so on. If the status indicates that the trailer 1202 is not full when it is at the facility, the server 804 or local computer system may instruct employees, via transmitting a notification regarding the determined load status of the trailer 1202 to the client application 822 running on their client device, to add more assets to the trailer 1202.

Method 1300 optionally includes the gateway device 1242, 1246 that received the determined status, transmitting (1370) the determined status to a server (e.g., server 804) and/or cloud of the IOT system 800 over long-range communication (e.g., cellular communication). For example, one of the gateway devices 1242, 1246 has at least one of a medium or high-power wireless communication interface and transmits the determined status to the server and/or cloud. In some embodiments, one of the gateway devices 1242, 1246 transmits the determined status to a mobile gateway (e.g., mobile gateway 810) running an application (e.g., application 822). In some embodiments, the tape nodes 1212, 1214, 1216 attached to assets 1210, 1220, 1230, tape node 1244, the gateway nodes 1242, 1244, and/or the camera 1240 broadcast the determined statues to the server(s)/cloud (e.g., server 804).

Method 1300 optionally includes the network communications environment 800 notifying (1380) a user of the determined status and instructs the user to load more items if the determined status (e.g., the load capacity) of the truck trailer 1202 satisfies a threshold. For example, the threshold may be set at a capacity percentage (e.g., 75%, 80%, etc.) and satisfying the threshold includes the determined status of the trailer is less than the threshold. For example, the determined status is 50% and the threshold is 80%; the network communications environment 800 transmits a notification to a client device (e.g., mobile gateway 810) for display to a user.

In one example of block 1380, the network communications environment 800 transmits the notification to a client device (e.g., client device, such as mobile gateway 810). In one example of block 1380, the notification is accessible by the client application 822 running on the client device. For example, the client device may be used by an employee walking around a facility, or it may be used by a driver. In the former case, the employee may get a ping (e.g., a notification) from a tape node or gateway (e.g., gateway 1242, 1246) on the trailer 1202 indicating the load capacity. In one example of block 1380, the notification may include a set of instructions (e.g., to load additional assets) for the user to follow that describes the particular truck trailer 1202 that is less than a full capacity, and which assets 1210, 1220, 1230 may be loaded to the truck trailer 1202. In addition to, or alternatively, the user may receive an instruction to remove assets from the truck trailer 1202 if the determined status exceeds the threshold. For example, if the determined status is 110% of the threshold.

In some embodiments, the assets are being delivered by the truck 1201 to a shipping facility. As the assets 1210, 1220, 1230 are being unloaded from the asset container (e.g., the truck trailer 1202), the tape nodes 1212, 1214, 1216 may communicate with, and transmit the determined status to, nearby nodes (e.g., stationary gateways 814 or mobile gateways 812) as they are transported through a facility. The nearby nodes may then transmit the determined status to client devices (third-party client devices or mobile gateways 810), that are running client applications (e.g., client applications 822) along with a notification indicating specific assets that may be loaded, and other information, such as a shipping manifest of the truck 1201.

In some embodiments, the camera(s) 1240 collects, and then transmits video data to tape nodes 1212, 1214, 1216. The tape nodes 1212, 1214, 1216 perform computation to determine status of trailer truck 1202 (e.g., full or empty, or number of objects in the trailer, etc.). The tape nodes 1212, 1214, 1216 store the determined status, and then report the determined status at a later time (e.g., when the tape node is removed/unloaded from the truck trailer 1202 and communicates with other nodes of the IOT system 800). For example, as the tape nodes 1212, 1214, 1216 are unloaded from the truck trailer 1202 at a checkpoint, the tape nodes 1212, 1214, 1216 transmit the determined status to a mobile gateway 810 or stationary gateway 814, upon being within a proximity of the gateways 810, 814.

In some embodiments, mesh networking is used to perform computations and analysis of the 3D vision. For example, the computation is distributed between each of tape nodes 1212, 1214, 1216, and/or 1244), gateway devices 1242, 1246, and/or camera(s) 1240. Further, the computation may be distributed between all of the nodes associated with the truck trailer 1202 and the components of the IoT system 800. For example, each tape node 1512 may contribute computational power (e.g., depending on their processing power) to perform computations and analysis of the 3D vision. For example, each of the tape nodes 1212, 1214, 1216 that have higher processing power may perform more complex computations and the tape nodes with lower processing power perform less complex computations. In some embodiments, the tape nodes 1212, 1214, 1216 communicate with each other over Bluetooth to coordinate distribution of the 3D vision computations and analysis. For example, the tape nodes 1212, 1214, 1216 create a mesh network in the vehicle. In some embodiments, the computation may be performed by machine learning techniques commonly known in the art. For example, any of the nodes that perform the computations may input any of the collected data (e.g., video data) to a trained machine learning model (e.g., a classifier), that outputs the determined status of the truck trailer 1202. For example, the server 804 may train the machine learning model and then download portions of the trained machine learning model, or the entire machine learning model, onto the tape nodes in the trailer 1202 for local execution by any one or more of the tape nodes.

Currently, identifying a specific asset across a large array of assets and/or finding the right parcel from a group of parcels (e.g., on a conveyor belt, a storage room with many parcels, etc.) is a challenge. Conventionally, use of the Geiger counter method, based on signal strength (RSSI) of wireless communication, is possible, but is a labor-intensive process. Advantageously, FIGS. 14A-FIG. 20 describes a system and method for identifying assets with attached tape nodes that transmit IR signals that are received by a client device.

Figure 14A:
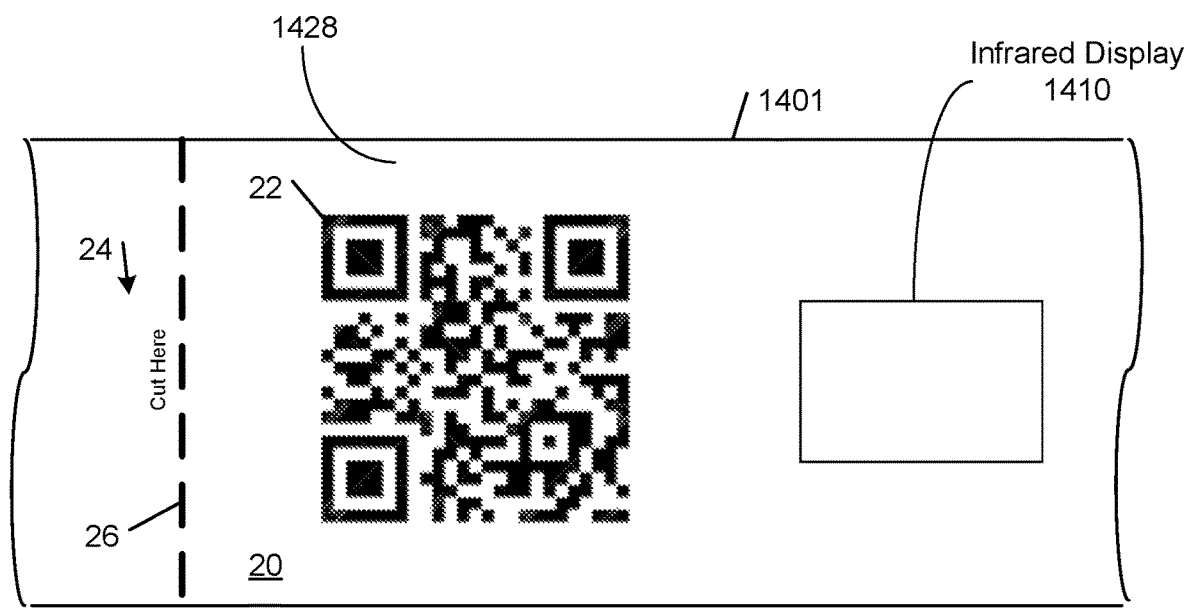
FIG. 14A shows a tape node that includes an infrared display, according to some embodiments.

FIG. 14A shows a tape node 1401 (also referred to as an infrared tape node 1401, and may be, e.g., any of tape nodes 818, 824, 828, 832, 842-848, 859, 860, 866, 1212, 1214, 1216, 1244, etc.) that includes an infrared display 1410, according to some embodiments. The tape node 1401 is a tracking device and is similar to the tape node 113, as shown in FIG. 1, the tape node 500 shown in FIG. 5, and the tape nodes 640, 670, and 680 shown in FIGS. 6A-6C, the tape nodes 1212, 1214, 1216, and 1244 shown in FIG. 12, with the addition of the infrared display 1410. The tape node 1401 has a flexible adhesive tape form factor and includes the wireless transducing circuit 640, 670, and 680 and the other components shown in FIGS. 6A-6C, according to some embodiments. The infrared display 1410 is exposed through the cover layer 1428 on the non-adhesive side of the tape node 1401. In some embodiments, an infrared display (not shown) is exposed through the substrate (e.g., the substrate from FIGS. 6A-6C) on the adhesive side of the tape node 1401, in addition to or alternative to the infrared display 1410. This may be the case for tape nodes 1401 that are adhered to a portion of an asset (e.g., assets 1210, 1220, 1230) that is transparent to the wavelengths of infrared light emitted by the infrared display 1410.

The infrared display 1410 is configured to emit infrared light. The infrared display 1410 may be a simple infrared light source, according to some embodiments. For example, the infrared display 1410 may be a single infrared light emitting diode (LED), an infrared light emitter, or some other infrared light source. In some embodiments, the infrared display 1410 is an array of infrared light sources (e.g., an array of infrared LEDs). The infrared display 1410 is connected to the other components of the wireless transducing circuit 640, 670, 680 by the flexible circuit (e.g., the flexible circuit 648, 648', 648", 6A-6C). The operation of the infrared display 1410 may be controlled according to executable program code that is executed by the processor(s) (e.g., processors 650, 650', 650", FIG. 6A-C.

While the infrared display 1410 is shown in FIG. 14 to have a rectangular shape, this is for exemplary purposes. The shape of the infrared display 1410 may be different and include any shape. For example, the infrared display 1410 may have a shape corresponding to a circle, an oval, a rounded rectangle, a sphere, a dome, or another shape.

Figure 14B:
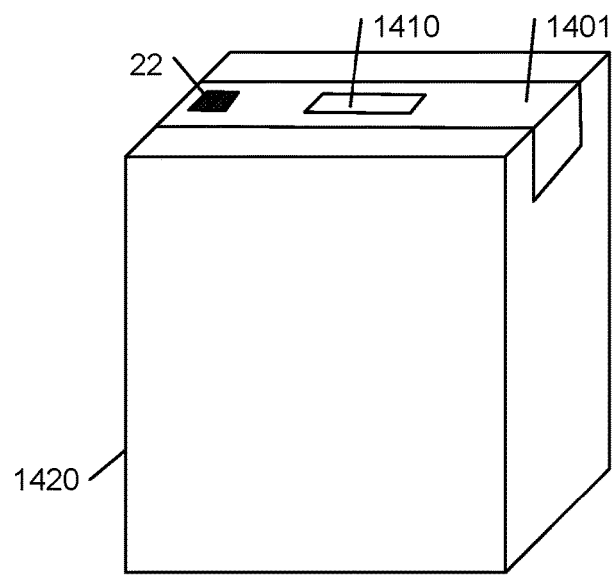
FIG. 14B shows one example of an asset with an embodiment of the tape node shown in FIG. 14A adhered to the asset, according to some embodiments.

FIG. 14B shows an example of an asset 1420 (e.g., any of assets 1210, 1220, 1230) with an embodiment of the tape node 1401 shown in FIG. 14A adhered to the asset 1420, according to some embodiments. The tape node 1401 wirelessly communicates with the IoT system 800 to track the asset 1420. The tape node 1401 may perform communications by directly communicating with other members of the IOT system 800 (e.g., the network 800) by relaying communications using multiple members (e.g., any of the tape nodes 818, 824, 828, 832, 842-848, 859, 860, 866, 1212, 1214, 1216, 1244, the mobile gateways 810, 812, stationary gateway, the server 404, network 802, etc.) of the IOT system 800. The tape node 1401 may communicate location data for the asset 1420 to the IOT system 800. The tape node 1401 may determine the location data for the asset 1420 based on GPS data, cellular data and triangulation, by determining a relative location to other members of the tracking system based on received signal strength indication (RSSI), or by some other method of locationing.

When guiding a user to a location of the asset 1420, the IOT system 800 may guide the user to an area (e.g., area 1501), based on the location data received from the tape node 1401. The infrared display 1410 is activated and emits infrared light to allow the user to find the exact location of the asset 1420 within the area. When the user is in the area or in proximity to the asset 1420 (e.g., within 50 ft), the user may search for the asset by using a client device (e.g., mobile gateway 810 or client application 822) to detect the infrared light emitted from infrared display 1410. Methods for guiding the user to the exact location of an asset are discussed below, with respect to FIGS. 17-20.

In some embodiments, the infrared display 1410 is an LED and may activate and display at a specific frequency in response to a client device (e.g., client device 1520) searching for the asset 1420. For example, the client device has an IR sensor that detects the IR light emitted by the infrared display (e.g., LED) and is viewable through the user interface (e.g., user interface 1525) of the client device. As soon as the client device detects the IR light emitted by the IR display 1410, by the IR sensor of the client device, the user interface 1525 of the client device displays a live video with the AR overlay 1530 (e.g., surrounding the asset). In some embodiments, the client device (e.g., client device 1520, discussed below) determines a relative position of the tape node based on the IR light (or LED) emitted from the IR display 1410. For example, the client device has an IR sensor (e.g., an IR depth-sensing camera) and the position of the bright spot within the image created from the IR sensor is used to determine the relative location for positioning the AR overlay 1530. For example, the client device 1520 uses computer vision techniques to determine the deviation from the center of an image to a bright spot, caused by the emitted IR, in an image. The client device may have the known focal length of the IR display 1410 stored locally in memory or may retrieve the focal length from the server 804 or tape node. Using the known angle of view, focal length, and resolution for both the IR sensor of the client device and the regular optical camera, the coordinates for the IR image bright spot, indicating the IR display 1410 of the tape node, are scaled to determine a corresponding pixel coordinate on the optical image. Basically, the cartesian coordinates for the bright spot in the client device IR sensor is scaled to a cartesian coordinate that corresponds to the same point in the client device optical sensor (camera). The scaled coordinate is then used to position the AR overlay 1530 within the optical image displayed by the client device 1520.

Figure 15A:
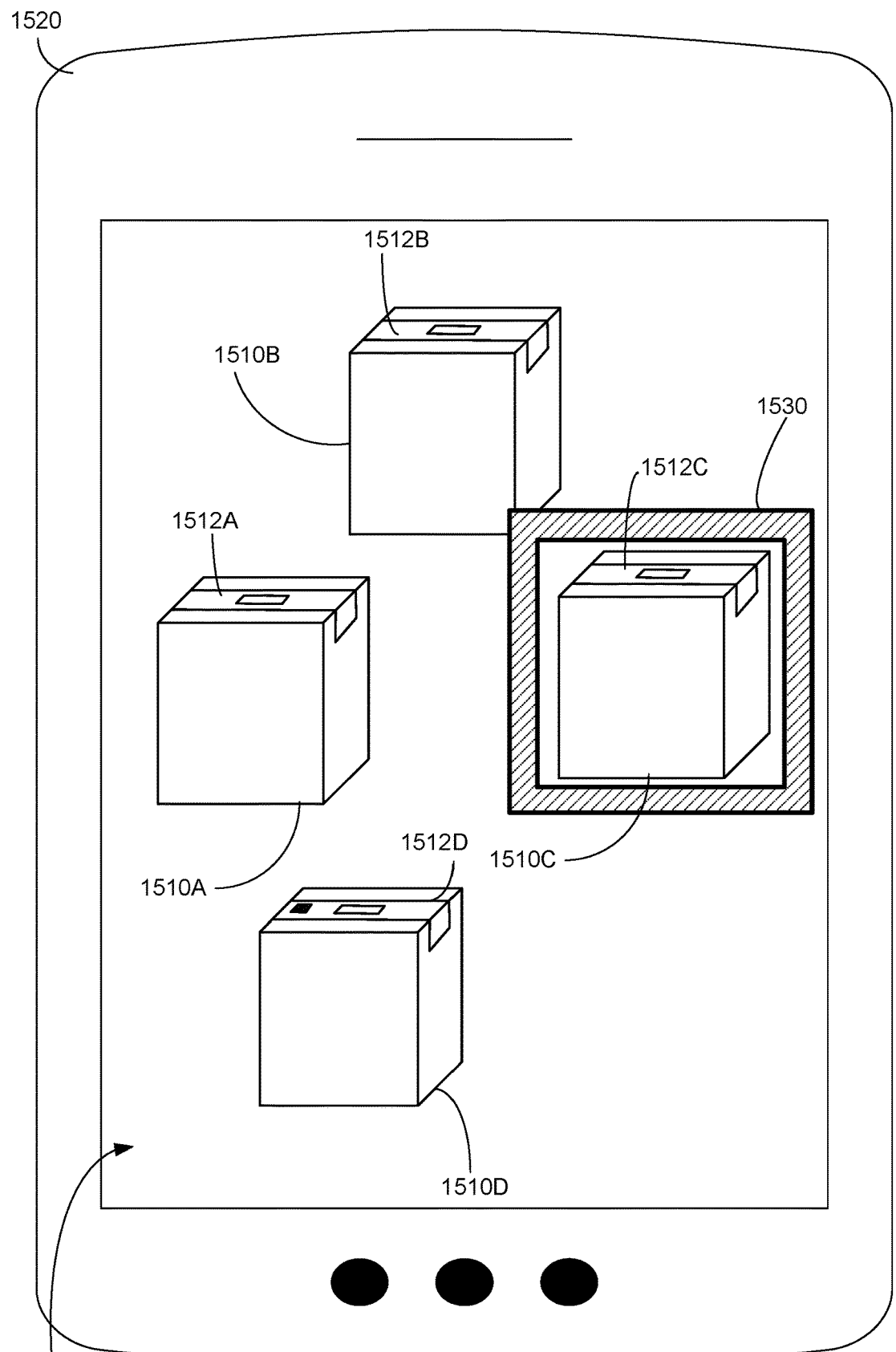
FIG. 15A shows one example of a client device locating one of a plurality of assets with attached tape nodes, according to some embodiments.

FIG. 15A shows one example interface of a client device 1520 displaying a live video with an augmented reality (AR) overlay 1530, according to some embodiments. Each tape node 1512A, 1512B, 1512C, 1512D is an embodiment of the tape node 1401 shown in FIGS. 14A and 14B, or any of the tape nodes 818, 824, 828, 832, 842-848, 859, 860, 866, 1212, 1214, 1216, 1244 shown in FIGS. 8, 12. A user interacts with the client device 1520 (e.g., using a client application 822; FIG. 8) to locate the asset 1510C, whereby the client device 1520 submits a request to locate the asset 1510C to the IOT system 800. In response, the IOT system 800 may guide, via the client device 1520, the user to the area using location tracking data received from the tape node 1512C and/or location tracking data received from another member of the IOT system 800 (e.g., from the server 804 relaying collected tracking data). For example, the IOT system 800 may transmit the last known location of the tape node 1512C to the client device 1520, which guides the user to the area 1501 that includes the last know location. For example, when the area 1501 is a storage room in a building, the IOT system 800 provides a room number of the storage room to the client device 1520 or may provide a map showing a route to the storage room. In another example, the tracking system 400 provides GPS coordinates of the area 1501 to the client device 1520.

In some embodiments, the client device 1520 displays a map within the user interface 1525 that is generated by the client application (e.g., client application 822) or on a website accessible by the client device 1520. The map is of an environment (e.g., a floorplan where the user is and that includes a path to where the asset 1510C is located). The user interface 1525 displays, within the graphical map, locations of gateway nodes (e.g., mobile gateways 810, 812 and/or stationary gateways 814) that are associated with a fixed location in the map environment.

When a user wants to locate a specific asset, the user interface 1525 may highlight the location of a gateway node, within the graphical display of the map, near the asset 1510C, for navigating the user to the location of the asset 1510C. Historical data referring to interactions of the tape node 1512C with other tape nodes 1512A, B, D can be used to track the asset 1510C and guide the user to the asset 1510C. For example, the tape node 1512C was last seen communicating with a specific tape node 1512A, B, D and/or gateway node, which are known to be in a specific location. The graphical map display the location of where the specific tape node 1512A, B, D and/or gateway nodes. In some embodiments, the historical data of the tape nodes 1512C may display within the map. Further, the AR overlay 1530 may be used to guide the user once the user is within a proximity (e.g., fifty feet) of the asset 1510C. In addition, the client device 1520 may guide the user by using a Geiger counter or other form of audio or visual frequency, indicating whether the user is getting closer or farther from the tape node in question. The audio or visual frequency may increase or decrease based on the RSSI of, e.g., Bluetooth signal between the client device 1520 and the tape node 1512C.

The interface and the AR overlay 1530 are displayed on a display of the client device 1520 (in this case a smartphone) that has the camera and the IR sensor substantially similar to the client device 1520. The client device triangulates the position of tape node being searched for (i.e., tape node 1512C) using RSSI. For example, a position of the client device 1520 is determined by triangulating signals, using RSSI, from at least two wireless tape nodes 1512 (or mobile gateways 810, 812, or stationary gateways 814) that have a known location. Additionally, 2D triangulation and 3D triangulation for both the tape nodes 1512 and the client device 1520 may occur (e.g., three, four, or more nodes with known location can be used to triangulate). Thus, the relative positions of the client device and the tape nodes may be determined, without the use of IR display 1410. Where the client device 1520 includes an orientation sensor (e.g., magnetometer, accelerometer-based sensors, etc.) the angular orientation of the client device 1520 may be determined. For example, the height of the client device 1520 may be estimated to be within a standard range based on an average height of a human. The AR overlay 1530 may be placed within the user interface 1525 based on the determined relative locations, without using the signal from the IR display 1410. The AR overlay 1530 includes a live videofeed that is captured by the camera. In the example of FIG. 15A, a screenshot of the live video-feed includes the assets 1510A, 1510B, 1510C, and 1510D. In this example, the user of the client device 1520 is searching for the asset 1510C using the IOT system 800.

Client device 1520 generates an AR overlay 1530 on the live video to highlight the position of the asset 1510C within the live feed. The position of the AR overlay 1530 is based on the relative position of the IR light emission from tape node 1512C detected by the IR sensor and its alignment with the camera. The AR overlay 1530 highlights the position of the asset 1510C when included within the live video. Accordingly, the user may pan the client device 1520 around within the area to the location of the asset. Advantageously, the AR overlay 1530 distinguishes the asset 1510C from other assets in the area (e.g., assets 1510A, 1510B, and 1510D, and their corresponding tape nodes 1512A, 1512B, and 1512D), thereby preventing the user from mistaking these other assets from the asset 1510C. After the asset 1510 has been found, the client device may scan a barcode on the asset 1510 or on the tape node 1512 (e.g., the identifier) to confirm that the asset is correctly identified.

In certain embodiments, the AR overlay 1530 is enhanced, through image analysis and image processing, to shape the AR overlay 1530 to outline the asset 1510C as shown within the live video. In some embodiments, the AR overlay 1530 may include an arrows indicating a direction to the asset 1510C.

Although shown as a smartphone in FIG. 15A, the client device 1520 may represent other types of devices including an augmented reality headset (e.g., AR glasses) or viewer that is integrated with or associated with the camera and the IR sensor. The AR overlay 1530 may be displayed to the user on the display of the AR headset or viewer.

The client device 1520 may search for a specific asset tape node with a known identifier (e.g., the identifier 122) or unique identifier (e.g., mac address). The client device 1520 may search for a Bluetooth device with an identifier that matches the identifier of the tape node attached to the asset it's looking for. The client device 1520 may then connect and instruct the tape node (e.g., 1512C) to activate its IR emitter. If the tape nodes themselves can't connect to the server 804 directly or through a gateway (e.g., stationary gateway 814 or mobile gateway 810, 812), a client application (e.g. client application 822), running on the client device, may notify a nearby tape node 1512 to activate its IR display 1410 directly. In some embodiments, the tape node 1512 may broadcast a signal, or broadcast its own identifier (e.g., hardware ID, software ID, or other ID) and the client application causes the client device to receive the broadcasted signal, determine that the signal contains an ID that corresponds to the asset tape node 1512 the client application is searching for, and then instruct the asset tape node 1512 to activate its IR display 1410.

In some embodiments, the client device 1520 communicates with the tape node 1512A-D or other IOT devices. For example, if the user wants to make a selection of a tape node 1512A-D or another IOT device of the wireless sensing system 800 in the environment, they may use the AR overlay 1530 to confirm that they are selecting the correct tape node 1512A-D or IOT device. The client device 1520 may then proceed to communicate (e.g., causing the tape node to flash the IR emission so the client device 1520 may confirm the identity of the tape node 1512C) with the tape node or IOT device. For example, if the user is trying to edit a setting of the tape node on asset 1510C, they may use the AR overlay 1530 to confirm that the tape node they are editing is the correct one that corresponds to asset 1510C. For example, the confirmation that the user is updating the correct tape node for that asset 1510C may be in the form of the IR emitter 1410 illuminating, causing the AR overlay 1530 to highlight asset 1510C in the live feed.

Figure 15B:
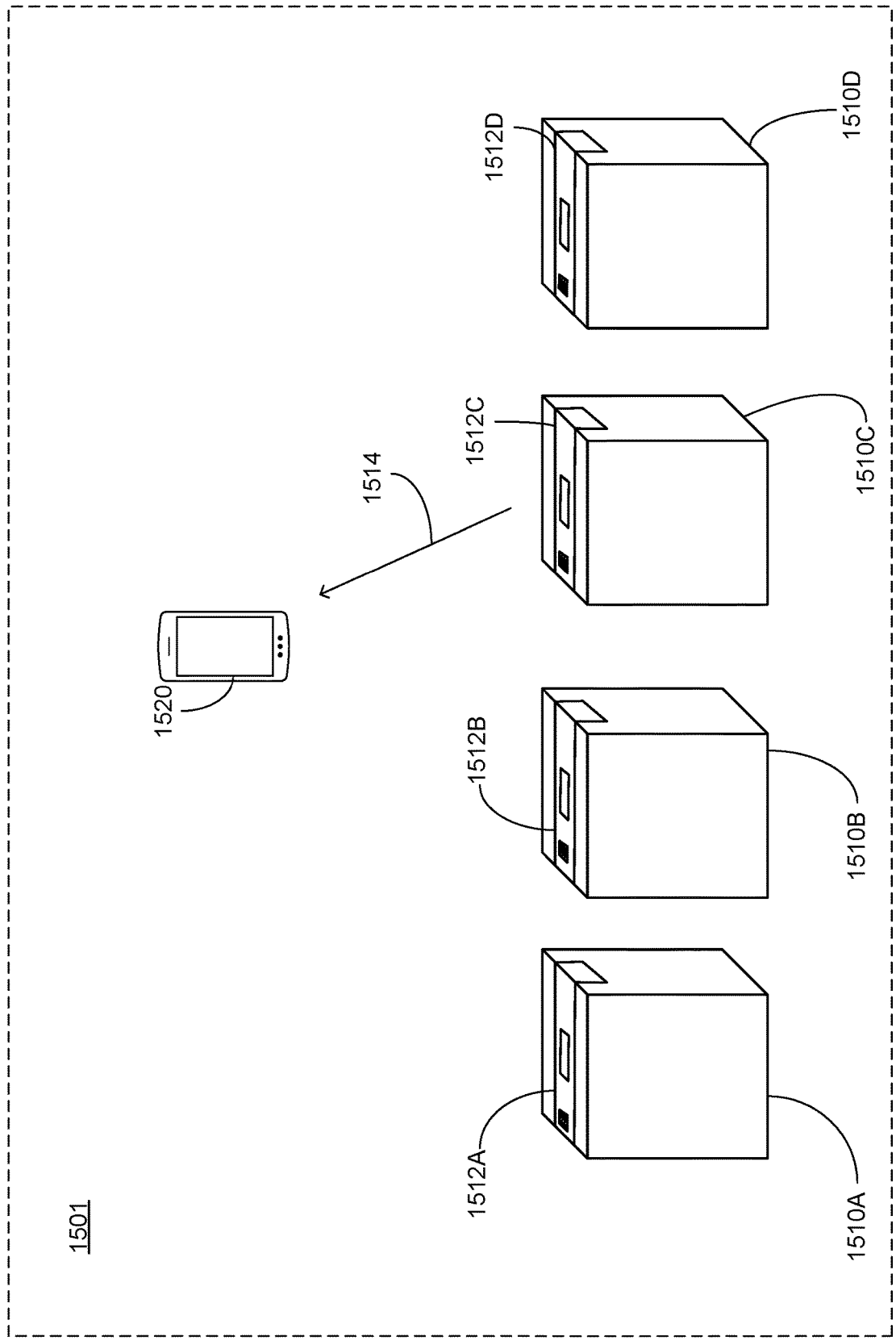
FIG. 15B shows another example of a client device locating the asset with the tape node among the plurality of assets, according to some embodiments.

FIG. 15B shows one example of the client device 1520 (e.g., any client device discussed herein and/or mobile gateway 810) locating asset 1510C with attached tape node 1512C among the group of assets 1510, according to some embodiments. Assets 1510A, 1510B, 1510C, 1510D are stored in area 1501. Area 1501 may be a room, a building, a portion of a room or building, some other indoor area, an outdoor area, or some other location. Each asset 1510A, 1510B, 1510C, 1510D has a tape node 1512A, 1512B, 1512C, 1512D, respectively In the example of FIG. 15B, the client device 1520 is shown as a smartphone that has an IR sensor (the IR sensor of the client device may be an infrared camera or infrared imaging system, or the IR sensor may be a custom client device with IR imaging, or a modified client device). However, the client device 1520 may represent other different devices, such as a computer, a laptop, a tablet pc, a specialized device, or some other type of client device. The client device 1520 includes a camera capable of capturing live video and an infrared sensor. In one embodiment, the infrared sensor is integrated with the camera. For example, an image sensor of the camera is sensitive to certain wavelengths of infrared light. In other embodiments, the infrared sensor is a charge coupled device (CCD), a CMOS sensor, a photo diode or an array of photodiodes, some other type of infrared sensor, or some combination thereof. The infrared sensor may be coupled to one or more lenses, objectives, other optical elements, or some combination thereof. For example, the infrared sensor may be a digital infrared camera integrated with the client device 1520.

In some embodiments, the infrared sensor is a structured light 3D scanner or structured light camera. For example, the infrared sensor may be a component of a smartphone that is otherwise used for infrared depth detection or 3D vision. In some examples, the infrared sensor is part of a time-of-flight system (e.g., an image sensor for a time-of-flight camera that is sensitive to infrared light).

In response to the IOT system 800 determining that the user is searching for the asset 1510C, the IOT system 800 instructs the tape node 1512C to activate its infrared display (e.g., infrared display 1410) to emit infrared light 1514. In one example, the tape node 1512C receives the instruction to activate its infrared display from the server 804. In another example, the tape node 1512C receives the instruction to activate its infrared display from the client device 1520. In another example, the tape node 1512C receives the instruction to activate its infrared display via another tape node, or via another member of the IOT system 800. In some embodiments, the IOT system 800 determines that the user should locate the asset 1510C based on a schedule for performing actions relevant to the asset. For example, when the asset 1510C is scheduled to leave (e.g., be transported) the area 1501 at a specified time, the tape node 1512C may autonomously activate its infrared display a threshold amount of time (e.g., an hour, thirty minutes, etc.) before the specified time. The tape node 1512C may be preprogrammed to activate its infrared display at predetermined times based on the schedule for performing actions. The schedule may be stored on a storage or memory of the tape node 1512C, in some embodiments. In some embodiments, as the client device 1520 generates a sound (based on signal strength) to indicate that the client device 1520 is closing in proximity to the asset. For example, the client device generates a beeping sound that increases in frequency as the client device 1520 approaches the asset.

In some embodiments, the tape node 1512C activates the infrared display 1410 when the client device 1520 is within a threshold distance (e.g., fifty feet, ten feet, within a same structure, e.g., the area) of the tape node 1512C. The proximity of the client device 1520 to the tape node 1512C may be determined by the tape node 1512C based on current location data of the client device 1520 received from the client device 1520 (e.g., GPS or cellular-based location data transmitted from the client device 1520 to the IOT system 800). Alternatively, the relative location of the client device 1520 is determined based on the client device 1520 making a wireless communication connection with the tape node 1512C. For example, when the tape node 1512C makes a Bluetooth connection with the client device 1520, the tape node 1512C may determine that the client device 1520 is within the threshold distance of the tape node 1512C. For example, the client device 1520 compares its current location with the last reported location of the tape node 1512C, and when within a threshold distance, the client device 1520 connects and instructs the tape node to activate the IR emitter. In some embodiments, the relative location of the client device 1520 may be determined based on the relative signal strength of the connection (e.g., using RSSI). In some embodiments, the IOT system 800 instructs the other tape nodes 1512A, 1512B, 1512D to deactivate their infrared displays when the IOT system 800 determines that the user is searching (or should be searching) for the asset 1510C. This prevents noise or crosstalk from the infrared displays of the tape node 1512A, 1512B, 1512D interfering with the IR sensor of the client device 1520 detecting the IR light emission 1514 from the tape node 1512C.

In some scenarios, cross-talk may be unavoidable because deactivating the IR emitters of tape nodes 1512A, B, and D is not possible. For example, two IR emitters may be simultaneously active and in close proximity to each other. In some embodiments, time-multiplexing is used to reduce or eliminate crosstalk. For example, each tape node 1512A-D may have preprogrammed instructions stored in memory to activate their IR emitters at a different time by multiplexing their activation signals. For example, each IR emitter is allocated a time slot (e.g., five minutes) during which no other IR emitter from the other tape nodes is active. In some embodiments, crosstalk is reduced by relying on tracking location of the asset 1210; the user interface 1525 may guide a user by displaying the AR overlay without the IR emitter being activated. In some embodiments, the IR emitter is used for fine positioning of the AR overlay 1530 by having the IR emitter emit a focused/narrow or collimated IR beam that is only capturable by the IR sensor of the client device at limited viewing angles (e.g., IR emitter may include some focusing elements, etc.). The IR emission is only detected by the IR sensor of the client device 1520 when the client device 1520 is oriented at an angle with respect to the asset 1510C. Likewise, if the asset 1510C has a known location and the user interface 1525 guides the user by displaying the AR overlay 1530, the client device may partition the pixels of the IR sensor to limit detection of the IR emission to a small portion of the viewing angle. For example, the partitioned pixels for detecting the IR emission are located at the center of the IR sensor of the client device. Further, the user interface 1525 may display a confirmation that the client device is pointed at the right asset 1510C.

Once the user is in the area 1501 and the infrared display of the asset 1512C has been activated, the user may identify the asset 1510C using the infrared sensor of the client device 1520. In some embodiments, the client device 1520 displays instructions to search for the asset 1510C using the infrared sensor. Client device 1520 displays an augmented reality (AR) view which includes AR overlays (see AR overlay 1530 of FIG. 15A) overlaid onto a live video from the camera of the client device 1520. In response to detecting the IR light emission 1514 when capturing the live video that includes the asset 1510C and the IR emitter of the tape node 1512C, the client device 1520 displays the AR overlay 1530 to highlight a position of the asset 1510C within the live video. An example of the AR view is discussed below in further detail, with respect to FIG. 15A. The position of the AR overlay 1530 is based on a relative direction of the infrared light emission 1514 detected by the infrared sensor of the client device 1520. A field-of-view (FOV) of the camera and the FOV of the IR emitter are aligned. For example, the position of the AR overlay may correspond to a pixel on an arrayed IR sensor where the infrared light emission 1514 (or a peak infrared light emission) is detected.

In some embodiments, the live video-feed is shown without AR overlays. For example, when the IR sensor is integrated with the camera, the IR light emission 1514 may appear in the live video-feed (e.g., as a visible light or flashing visible light). The user may locate the asset 1510C by searching for a tape node in the live video-feed that has the IR light emission 1514 appearing to emit from the tape node 1512C.

In some embodiments, the user searches for the asset 1510C using both the wireless communication connection between the client device 1520 and the tape node 1512C and the detection of the infrared light emission 1514 by the client device 1520. For example, the user may validate the found asset 1520C based on both the relative signal strength of the wireless communication connection (e.g., a strong signal indicating proximity) between the tape node 1512C and the client device 1520 and the detection of the IR light emission 1514 by the client device 1520.

In some embodiments, the tape node 1512C encodes the IR light emission 1514 (e.g., by modulating the IR light emission 1514), and the client device 1520 confirms that the asset 1510 is the correct asset 1510 by checking the encoding against a known encoding associated with the asset 1510 or tape node 1512. For example, the known encoding may be predetermined and stored within a database of the server 804 or within local memory. In one example, the encoding is variable, such as 2-step verification/authentication, and the client device 1520 generates a temporary code and the server 804 must authenticate the temporary code by checking the temporary code.

Figure 16:
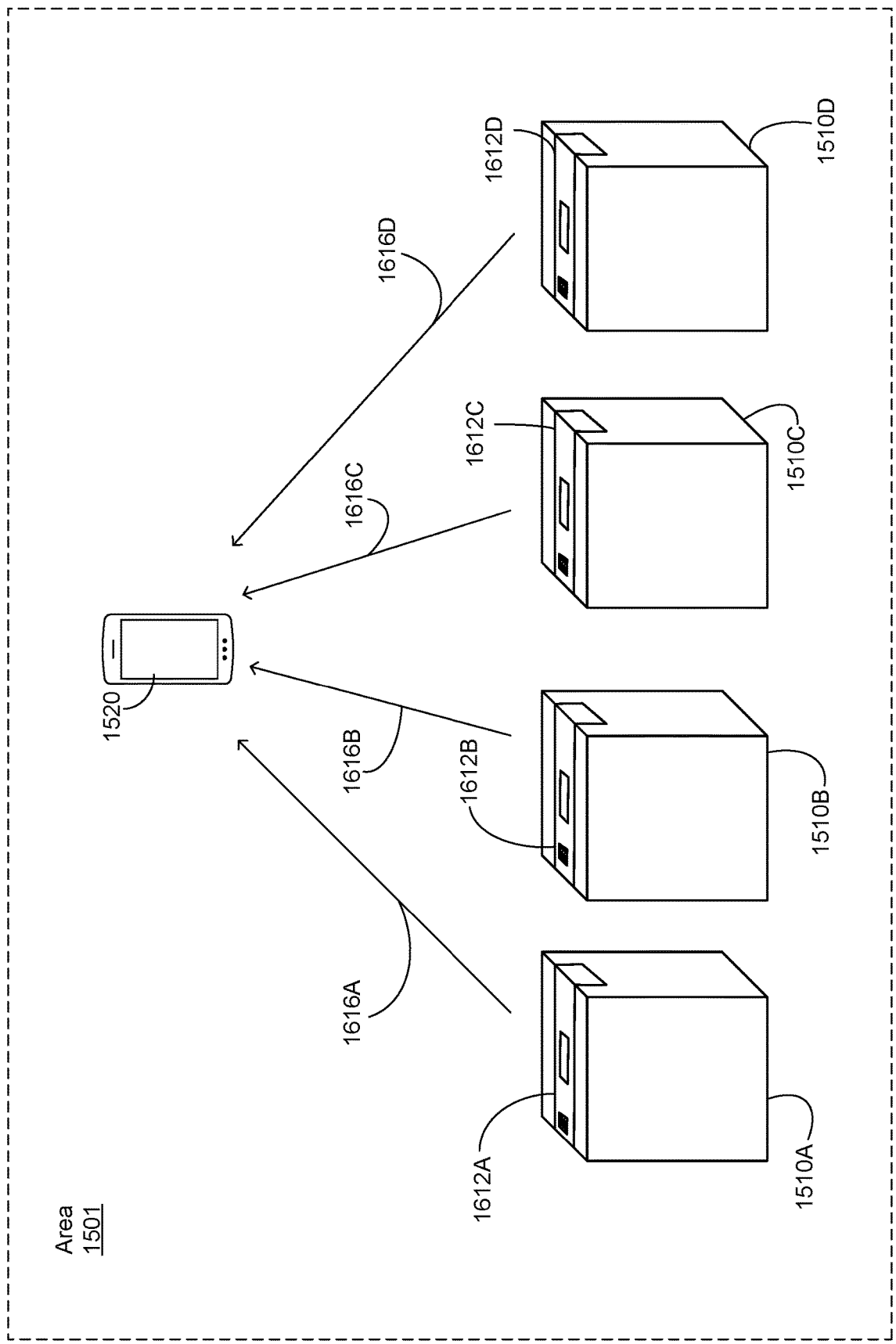
FIG. 16 shows one example interface of a client device displaying an augmented reality (AR) view of the asset of FIG. 12A, according to some embodiments.

FIG. 16 shows an alternate example of using the client device 1520 to locate the asset 1510C with the attached tape node 1612C when it is located among a group of assets, according to some embodiments. In this case, each of the assets 1510A, 1510B, 1510C, 1510D in the area 1501 includes a respective tape node 1612A, 1612B, 1612C, 1612D, similar to the example shown in FIG. 15B. Each tape node 1612A, 1612B, 1612C, 1612D includes a respective infrared display that emits encoded infrared light 1616A, 1616B, 1616C, 1616D.

When the user of the client device 1520 is searching for the asset 1510C in the area 1501, each of the tape nodes 1612A, 1612B, 1612C, 1612D emits their respective encoded light emission 1616A, 1616B, 1616C, 1616D. Each encoded light emission 1616A, 1616B, 1616C, 1616D may be encoded by modulating the amplitude of the light emission, however, other method of encoding may be used without departing from the scope hereof. Since the light emissions from the tape nodes 1612A, 1612B, 1612C, 1612D, are encoded, the client device 1520 may decode each detected IR light signal to determine whether it is from the tape node that is being searched for. Advantageously, the client device 1520 thereby locates the asset 1510C when the client device 1520 detects more than one of the encoded IR light emissions 1616A, 1616B, 1616C, 1616D simultaneously.

In some embodiments, the encoded IR light emissions 1616A, 1616B, 1616C, 1616D are modulated based on time multiplexing, such that each tape node emits IR light at a different interval. In this case, the client device 1520 and the tape nodes 1612A, 1612B, 1612C, 1612D may sync their timing, and the client device may detect the IR light emissions that occurs at a time interval allotted to tape node 1612C that it is searching for. In some embodiments, the syncing of the tape nodes 1612A, 1612B, 1612C, 1612D with the client device 1520 is based on a time synchronization signal received from a gateway node (e.g., gateway nodes 1442, 1446, mobile gateways 810, 812, and/or stationary gateway 814, FIGS. 8, 14) or another tape node. For example, each tape node 1612A, 1612B, 1612C, 1612D and the client device 1520 may receive a coordinated universal time (UTC) timestamp from one of the gateway nodes or another tape node to base the time syncing on.

In some embodiments, each tape node encodes their IR light emission 1616A, 1616B, 1616C, 1616D with an identifier signal. For example, each tape node may encode its IR light emission 1616A, 1616B, 1616C, 1616D with a frequency modulated (FM) or amplitude modulated (AM) signal that indicates a unique identifier or a portion (e.g., the last four bits) of a unique identifier for the tape node. The FM or AM signal can be used to transmit information to the client device 1520 that allows the client device 1520 to determine that the encoded IR light emission 1616C is from the tape node 1612C. Thus, the client device 1520 guides the user to the asset 1510C when this IR FM or AM signal is determined to match the tape node 1612C.

In some embodiments of encoding the identifier of the tape node 1512 into the IR signal, the identifier is compressed. For example, compression includes truncating the identifier to the last two bits, the first two bits, or two arbitrary bits, etc. When decompressing the compressed tape node identifier, aliasing may occur (e.g., the compressed identifier may correspond to two or more similar un-truncated identifiers/addresses of other tape nodes 1512). In this scenario, a Bluetooth connection with the tape node 1512 may be used to match the tape node 1512 with the correct identifier. The history of the asset (e.g., tracking location, etc.) may be used to validate the identifier with the correct tape node. In the scenario of the decompression resulting in two possible identifiers for two different tape nodes 1512, the client device 1520 may reference the server 804 for the history (e.g., tracking location, etc.) of the two different tape nodes 1512 to determine if one of the tape nodes 1512 is in a totally different location from the current location of the client device. Validation may also occur when the client device 1520 is within a threshold distance (e.g., twenty feet) from the last known location of the correct tape node 1512.

Figure 17:
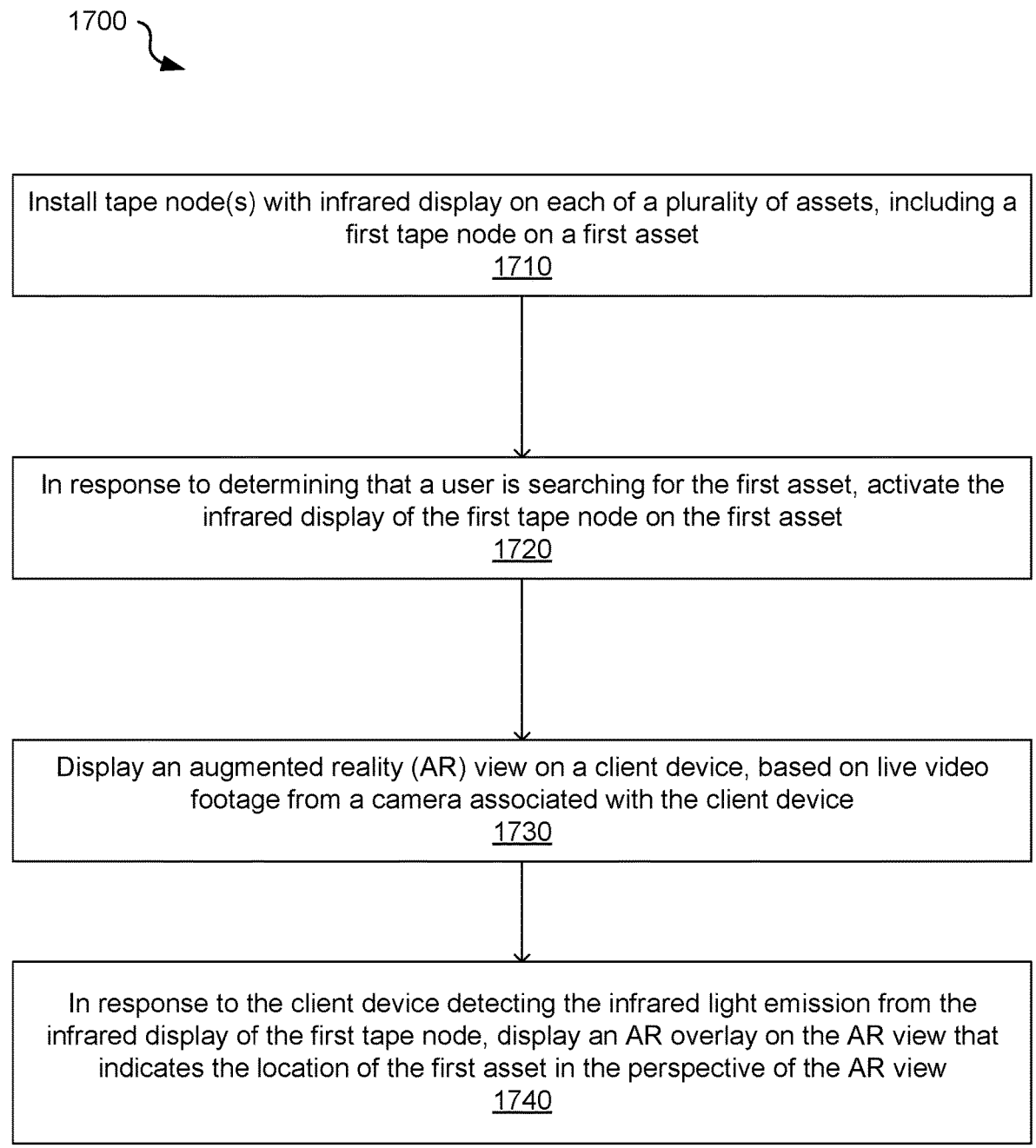
FIG. 17 is a flowchart illustrating one example method for guiding a user to an asset with an attached tape node, according to some embodiments.

FIG. 17 is a flowchart illustrating one example method 1700 for guiding a user to a location of an asset with an attached tape node with an IR sensor, according to some embodiments. The method 1700 is implemented at least in part by each of the IOT system 800, the client device 1520, and the tape node 1512C, 1612C, for example.

The method 1700 optionally includes installing (1710) a tape node (e.g., tape node 1401, 1512C, 1612C) that includes the infrared display (e.g., infrared display 1410) on an asset (e.g., asset 1420, 1510). The IOT system 800 activates (1720) the infrared display of the tape node associated with the asset. In one example of block 1720, the IOT system 800 sends a message instructing the tape node, based on its association with the asset, to activate its IR display 1410 (1514). The activation may be in response to determining that a user is searching for the asset. For example, the IOT system 800 receives a request from the client device (e.g., client device 1520) indicating the search for the asset. The method 1700 detects (1730) the IR light emission using an IR sensor of a client device. In one example of block 1730, the client device 1520 activates its IR sensor to detect the IR light emitted from the IR emitter of the tape node.

The method 1700 further includes displaying (1740) an augmented reality (AR) overlay (e.g., AR overlay 1530) on a live video from a camera of the client device, the AR overlay being positioned within the live video based on a location of the detected IR light emission within the IR sensor. In one example of block 1740, the client device 1520 displays the AR overlay 1530 on the live video captured by its camera, where the position of the AR overlay 1530 is based on the location of the detected IR light emission within the IR sensor. The user may search for the first asset in the area by scanning the area with the camera and infrared sensor of the client device, and when the IR light emission is detected by the sensor, the client device 1520 display the AR overlay 1530 on the live video, in a position relative to the position of the detected IR light emission within the IR sensor, thereby highlighting the position of the asset to the user.

Figure 18:
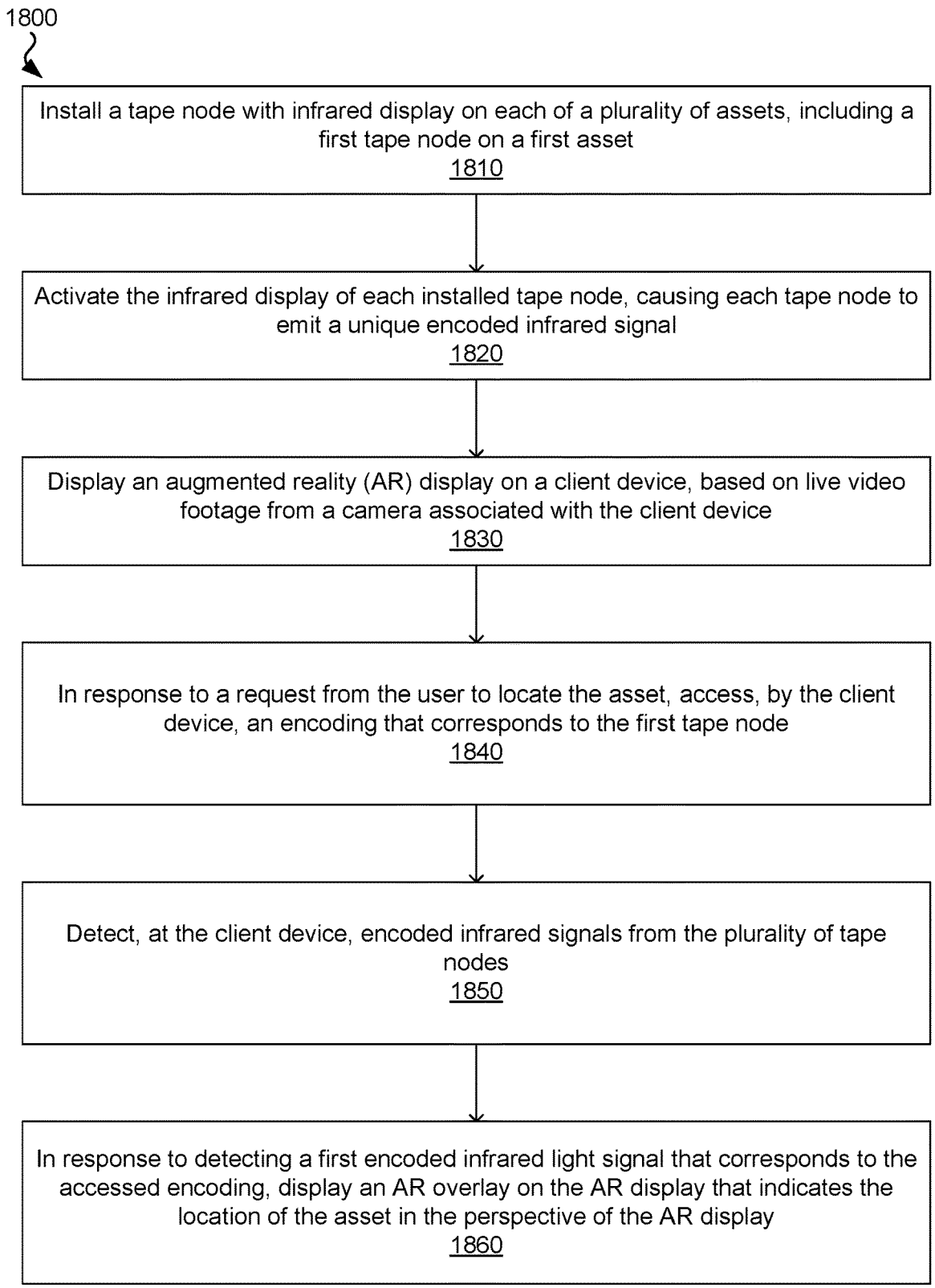
FIG. 18 is a flowchart illustrating another example method of guiding a user to an asset with an attached tape node, according to some embodiments.

FIG. 18 is a flowchart illustrating one example method 1800 for guiding a user to a location of an asset with an attached tape node, according to some embodiments. The method 1800 is implemented at least in part by each of the IOT system 800, the client device 1520, and the tape nodes 1512/1612, for example. The method 1800 optionally includes installing (1810) a tape node 1401 on each of a plurality of assets (e.g., assets 1510), including a first tape node (e.g., tape nodes 1512C/1612C) on a first asset (e.g., asset 1510C). In one example of block 1810, the tape nodes 1512A-D are installed on the assets 1510A-D, respectively, where the tape nodes 1512A-D include the infrared display 1410. The method 1800 further includes activating (1820) the infrared display on each installed tape node, causing each tape node to emit a unique encoded infrared light signal (e.g., IR emission 1514, 1616A-D). In some embodiments, each infrared light signal is encoded with a unique identifier that corresponds to the respective tape node. In some embodiments, the encoding is part of a time multiplexing for the IR light emissions of the tape nodes, as discussed above.

In some embodiments, the IR emitters of each tape node are activated in response to determining that the user is searching for the first asset. In some embodiments, an IR emitter of a respective tape node activates in response to a client device being within a threshold distance (e.g., five feet, twenty feet, within the same building, etc.) of the respective tape node. In some embodiments, an IR emitter of a tape node activates in response to a client device establishing a communication connection, or attempting to establish a communication connection, with the tape node. In some embodiments, an IR emitter of a respective tape node activates in response to receiving a wake signal. For example, the IOT system 800 may transmit a wake signal to each tape node in an area of the client device, if it is determined that the first asset is located in the area.

The method 1800 further includes displaying (1830) an augmented reality (AR) display on the client device, based on live video from a camera associated with the client device. In one example of block 1830, the display is in response to determining that a user is searching for the asset and the IOT system 800 receives a request from the client device 1520 indicating the search for the asset 1510C. The client device accesses (1840) an encoding that corresponds to the one tape node. In one example of block 1840, the accessed encoding corresponds to the signal encoded into the infrared light emission of the one tape node in step 1820. For example, the accessed encoding may include a unique identifier that corresponds to the one tape node. The encoding may be accessed by referencing a database in the server 804 of the IOT system 800, according to some embodiments. In some embodiments, the encoding is stored on the client device. In some embodiments, the encoding is transmitted from another member (e.g., a stationary gateway 814 located nearby) of the IOT system 800.

Method 1800 further includes the client device detecting (1850) the uniquely encoded infrared signals from the plurality of tape nodes. In some embodiments, the detecting may be in response to the user searching for the first asset using the client device. The method 1800 further includes determining (1860) one of the encoded infrared light signal corresponds to the accessed encoding, and displaying an AR overlay on a live video to highlight the location of the one asset in the live video. In one example of block 1860, the client device decodes and compares the uniquely encoded signals to the accessed encoding, and the matching uniquely encoded signal, displays the AR overlay 1530 on the live video to highlight the location of the asset 1510C within the live video. Advantageously, the user is able to find the exact location of the asset 1510C within its environment.

Figure 19:
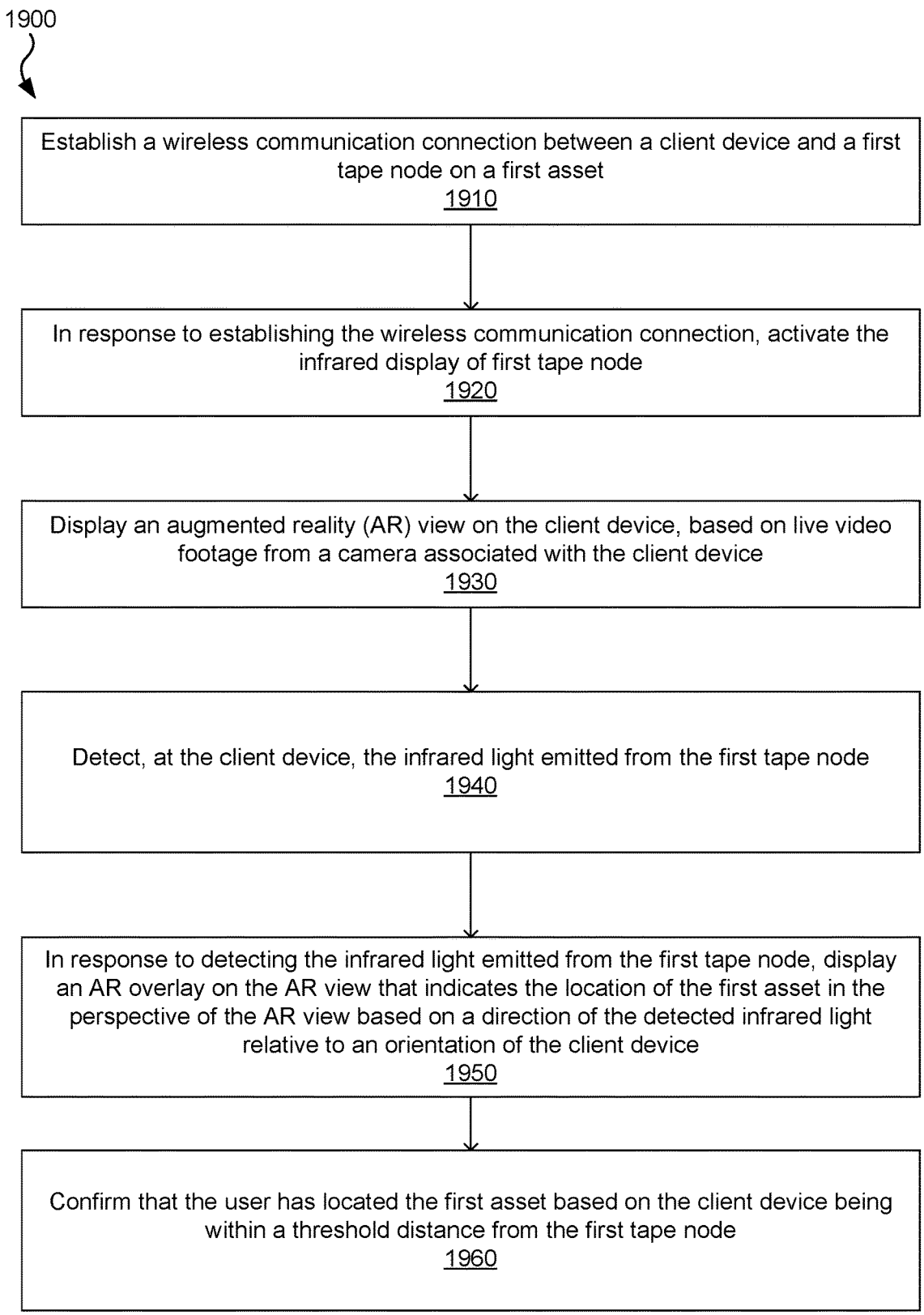
FIG. 19 is a flowchart illustrating another example method of guiding a user to an asset with an attached tape node, according to some embodiments.

FIG. 19 is a flowchart illustrating one alternate method 1900 of guiding a user to a location of an asset with an attached tape node, according to some embodiments. The method 1900 establishes a wireless communication connection (1910) between a user's client device (e.g., client device 1520) and a first tape node (e.g., tape node 1401, 1512C that includes the infrared display 1410). The method 1900, in response to establishing the wireless communication, activates the infrared display 1410 of the tape node (1920), causing the IR emitter to emit IR light (e.g., IR emission 1514, 1616C). The client device displays (1930) a live video from a camera of the client device. For example, the user pans the client device within the area containing the asset as the client device displays the live video on the display of the client device.

When the client device's IR sensor and camera are directed towards the tape node, the client device detects (1940) the infrared light emitted from the first tape node. In response, the client device displays (1950) the AR overlay 1530 on the live video to highlight the position of the asset within the live video based on a position of the detected IR light within the IR sensor. Optionally, when the user approaches the first tape node, the IOT system 800 confirms (1960) the user correctly located the first asset based on the distance (e.g., a foot, two feet, a few inches, etc.) of the client device from the first tape node. The distance may be determined based on the relative signal strength (RSSI) of the wireless communication connection.

Figure 20:
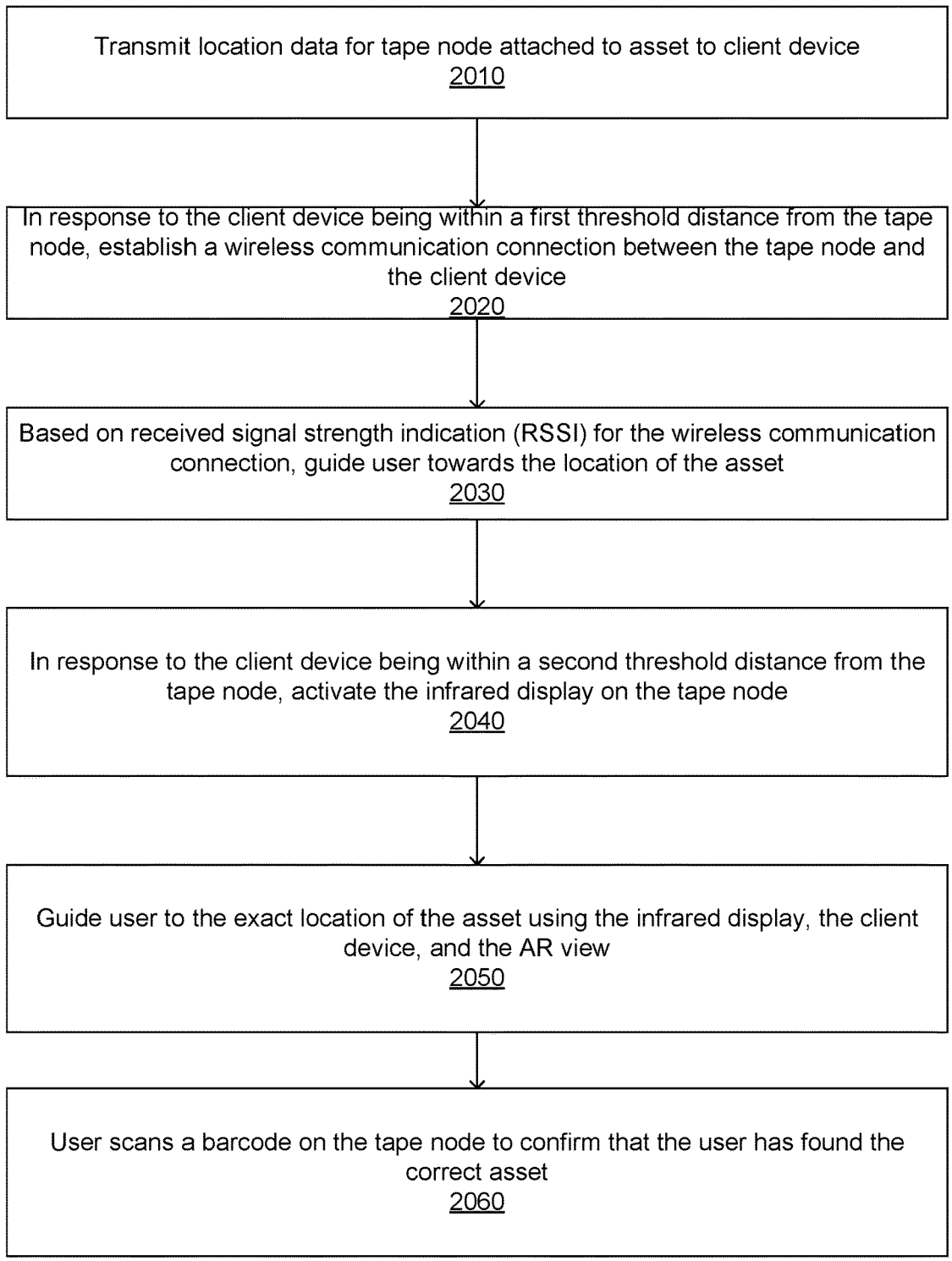
FIG. 20 is a flowchart illustrating another example method of guiding a user to an asset with an attached tape node, according to some embodiments.

FIG. 20 is a flowchart illustrating one example method 2000 for guiding a user to a location of an asset with an attached tape node, according to some embodiments. Method 2000 includes the IOT system 800 transmitting (2010) location data, captured by a tape node 1401 attached to the asset, to a client device (e.g., client device 1520) associated with the user. The transmitted location data may be GPS data, cellular-based location data, or some other type of location data. For example, the transmitted location data may be a geographic coordinate or a room number for a building. The client device guides (e.g., directs with a map showing the locations of the user and the asset) the user to an area where the asset is located based on the location data. In some embodiments, the client device provides turn-by-turn navigation to the user or displays a map with the location of the area.

When the client device is within a first threshold distance of the tape node (e.g., when the user reaches the area with the asset), a wireless communication connection is established (2020) between the tape node and the client device. The first threshold distance may correspond to a communication range of the type of wireless communication (e.g., low power wireless-communication interface 652) connection that is established. In some embodiments, the wireless communication connection is a Bluetooth connection, and the first threshold distance corresponds to a communication range for the Bluetooth connection. The user is guided (2030) to the location of the asset within the area, based on the received signal strength indication (RSSI) of the established wireless communication connection. Since the RSSI will be lower as the user and client device get farther away from the tape node, the user may be guided to the asset by displaying on the client device the user's estimated distance from the tape node based on the RSSI.

In response to the client device being within a second threshold distance from the tape node (determined based on the RSSI), the tape node activates (2040) its infrared display, emitting infrared light (e.g., infrared display 1410). Method 2000 further includes the client device guiding (2050) the user to the exact location of the asset by the client device displaying the AR overlay 1530 in conjunction with the client device's IR sensor as described above, with respect to FIGS. 15A-19. After the user has located the asset and the tape node using the AR overlay 1530 in step 2050, method 2000 optionally includes the client device scanning (2060) a barcode on the tape node to confirm that the correct asset has been located. The client device may compare the barcode to an identifier for the tape node that is associated with the asset to confirm that it is the correct asset. The identifier may be accessed from the database 808 or received from another member of the IOT system 800 and stored on the client device.

The methods shown in FIGS. 17-20 are examples. Using the IOT system 800, the client device 1520, and the tape node 1401, the user may locate assets using other and/or additional methods and steps not shown in FIGS. 17-20, according to some embodiments.

Figure 21:
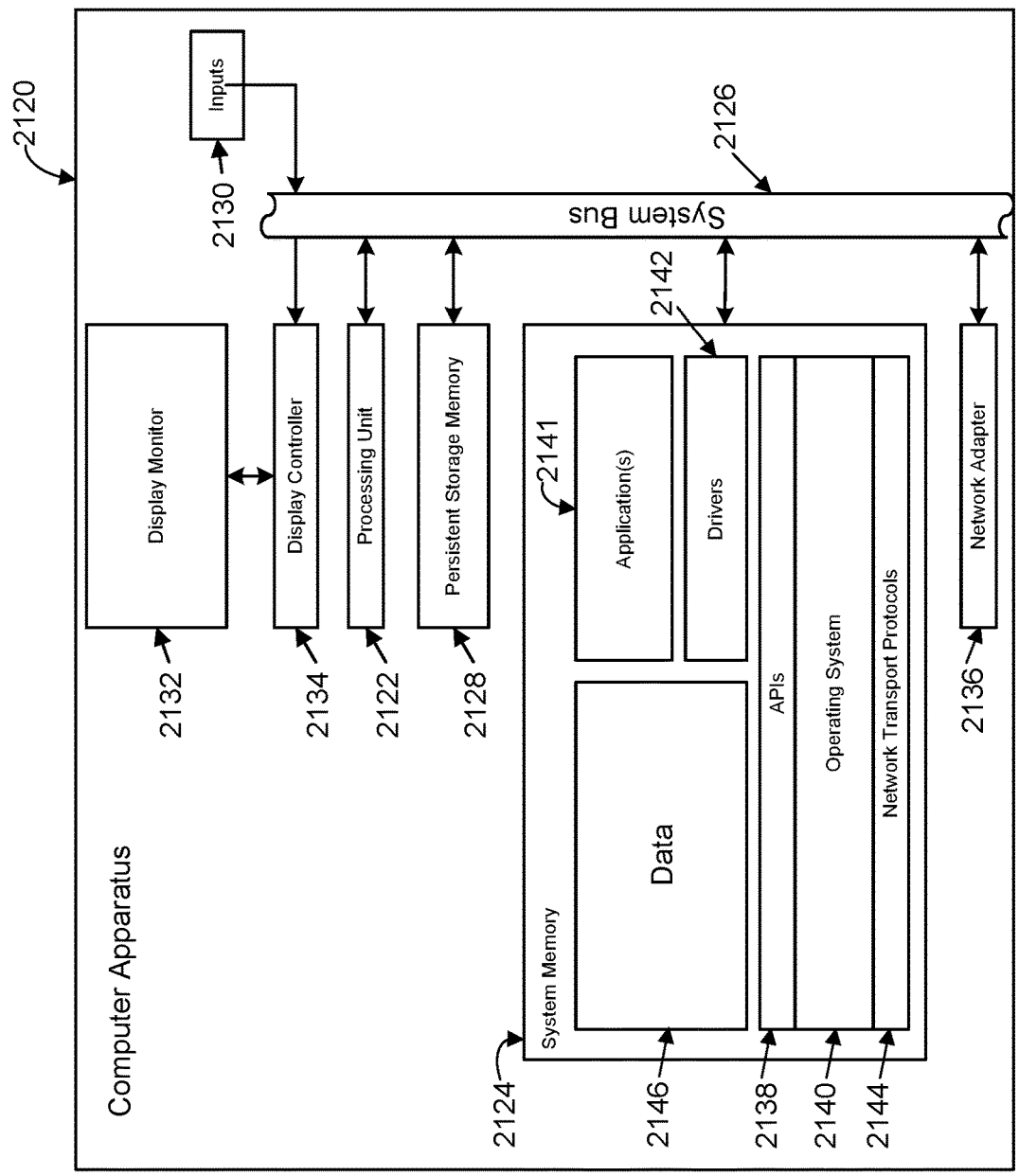
FIG. 21 shows an example embodiment of computer apparatus, according to some embodiments.

FIG. 21 shows an example embodiment of computer apparatus 2120 that, either alone or in combination with one or more other computing apparatus, is operable to implement one or more of the computer systems described in this specification. For example, computer apparatus 2120 may represent any of the client device 1520, a tape node (e.g., tape nodes 818, 824, 828, 832, 842-848, 859, 860, 866, 1212, 1214, 1216, 1244, 1401, 1512A-D, etc. shown in FIGS. 8, 12, 14, and 15), and/or the stationary or mobile gateways (e.g., mobile gateway 810, 812, stationary gateway 814 shown in FIG. 8). The computer apparatus 2120 includes a processing unit 2122, a system memory 2124, and a system bus 2126 that couples the processing unit 2122 to the various components of the computer apparatus 2120. The processing unit 2122 may include one or more data processors, each of which may be in the form of any one of various commercially available computer processors. The system memory 2124 includes one or more computer-readable media that typically are associated with a software application addressing space that defines the addresses that are available to software applications. The system memory 2124 may include a read only memory (ROM) that stores a basic input/output system (BIOS) that contains start-up routines for the computer apparatus 2120, and a random-access memory (RAM). The system bus 2126 may be a memory bus, a peripheral bus, or a local bus, and may be compatible with any of a variety of bus protocols, including PCI, VESA, Microchannel, ISA, and EISA. The computer apparatus 2120 also includes a persistent storage memory 2128 (e.g., a hard drive, a floppy drive, a CD ROM drive, magnetic tape drives, flash memory devices, and digital video disks) that is connected to the system bus 2126 and contains one or more computer-readable media disks that provide non-volatile or persistent storage for data, data structures and computer-executable instructions.

A user may interact (e.g., input commands or data) with the computer apparatus 2120 using one or more input devices 2130 (e.g. one or more keyboards, computer mice, microphones, cameras, joysticks, physical motion sensors, and touch pads). Information may be presented through a graphical user interface (GUI) that is presented to the user on a display monitor 2132, which is controlled by a display controller 2134. The computer apparatus 2120 also may include other input/output hardware (e.g., peripheral output devices, such as speakers and a printer). The computer apparatus 2120 connects to other network nodes through a network adapter 2136 (also referred to as a "network interface card" or NIC).

A number of program modules may be stored in the system memory 2124, including application programming interfaces 2138 (APIs), an operating system (OS) 2140 (e.g., the Windows® operating system available from Microsoft Corporation of Redmond, Washington U.S.A.), software applications 2141 including one or more software applications programming the computer apparatus 2120 to perform one or more of the steps, tasks, operations, or processes of the positioning and/or tracking systems described herein, drivers 2142 (e.g., a GUI driver), network transport protocols 2144, and data 2146 (e.g., input data, output data, program data, a registry, and configuration settings).

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system for determining a load status of an asset container, comprising:
   a first tape node having a first low-power wireless-communications interface and a first camera, the first tape node operable to capture and transmit a first image; and
   a second tape node, comprising:
      a second camera;
      a second low-power wireless-communication interface;
      a processor; and
      memory communicatively coupled with the processor and storing machine-readable instructions that, when executed by the processor, cause the processor to:
         receive, from the first tape node, the first image;
         capture a second image using the second camera;
         perform computer vision techniques on the first and second images to generate the load status of the asset container; and
         transmit the load status to a nearby node.

2. The system of claim 1, wherein the computer vision techniques include one of stereoscopy, multi-stereoscopy, and time-of-flight sensing.

3. The system of claim 1, the memory storing further machine-readable instructions that, when executed by the processor, further cause the processor to:
   determine that the first camera is in an acceptable position to capture the first image to use for the computer vision techniques for generating the load status;
   identify that the second tape node is within the asset container; and
   receive confirmation that the second camera of the second tape node is in a position that enables the second camera to capture an acceptable second image to use for the computer vision techniques for generating the load status.

4. The system of claim 1, wherein the nearby node is a client device running a client application of the wireless sensing system, wherein the transmitting the load status includes a notification that includes instructions for a human operator to load the asset container with assets that increase the load of the asset container.

5. The system of claim 1, wherein the first and second cameras capturing the first and second images are responsive to the first tape node receiving a signal from a third tape node adhered to a door of the asset container indicating an accelerometer embedded within the third tape node is exceeding a threshold, the memory storing further machine-readable instructions that, when executed by the processor, further cause the processor to:
   receive, from the third tape node, the signal indicating the accelerometer is exceeding a threshold.

6. The system of claim 1, wherein the capturing of the first and second images occur in predetermined time intervals or at predetermined locations.

7. The system of claim 1, the memory storing further machine-readable instructions that, when executed by the processor, further cause the processor to:
   synchronize the capture of the second image with the capture of the first image by communicating a time with the second tape node to begin capture of the first and second images.

8. The system of claim 1, the memory storing further machine-readable instructions that, when executed by the processor, further cause the processor to:
receive an instruction from a third tape node to capture the second image.

9. A system for determining a load status of an asset container, comprising:
a first tape node having a first low-power wireless-communications interface and a first camera operable to capture a first image;
a second tape node comprising:
a second camera;
a second low-power wireless-communication interface;
a processor; and
memory communicatively coupled with the processor and storing machine-readable instructions that, when executed by the processor, cause the processor to:
receive, from the first tape node, the captured first image;
capture a second image using the second camera;
transmit, to a wireless node having another low-power wireless-communications interface, the captured first and second images to generate a load status of the asset container;
receive, from the wireless node and based on computer vision techniques on the first and second images, the load status of the asset container; and
transmit a notification to a nearby node that includes the load status of the asset container.

10. The system of claim 9, the memory storing further machine-readable instructions that, when executed by the processor, cause the processor to:
identify the first tape node; and
receive, from the first tape node, confirmation that the first camera of the first tape node is in a position that enables the first camera to capture an acceptable first image to use for the computer vision techniques for generating the load status.

11. The system of claim 9, wherein the wireless node is a stationary gateway adhered to the asset container.

12. The system of claim 9, wherein the nearby node is a client device running a client application of the system, wherein the notification includes instructions for a human operator to load additional assets to the asset container.

13. The system of claim 9, wherein the first and second cameras capturing the first and second images are responsive to the second tape node receiving a signal from a third tape node adhered to a door of the asset container indicating an accelerometer of the third tape node is exceeding a threshold, the memory storing further machine-readable instructions that, when executed by the processor, further cause the processor to:
receive, from the third tape node, the signal indicating the accelerometer is exceeding a threshold.

14. A method for determining a load status of an asset container, comprising:
receiving, by a first tape node adhered to a first surface, a first image of an interior of the asset container;
receiving, by the first tape node, a second image of the interior of the asset container captured by an embedded camera of a second tape node adhered to a second surface; and
determining, by performing computer vision techniques on the first and second images, a load status of the asset container; and
transmit the load status of the asset container to a nearby node.

15. The method of claim 14, wherein the computer vision techniques include one of stereoscopy, multi-stereoscopy, and time-of-flight sensing.

16. The method of claim 14, wherein the first image was received by the first tape node from a first camera, further comprising:
determining, by the first tape node, that the first camera is in an acceptable position to capture the first image to use for the computer vision techniques for determining the load status;
identifying, by the first tape node, that the second tape node is within the asset container; and
receiving confirmation that the embedded camera of the second tape node is in a position that enables the embedded camera to capture an acceptable second image to use for the computer vision techniques for determining the load status.

17. The method of claim 14, further comprising: receiving, by the first tape node, a signal from a third tape node adhered to a door of the asset container indicating an accelerometer of the third tape node has measured an acceleration exceeding a threshold, wherein the first and second images are captured responsive to the first tape node receiving the signal from the third tape node.

18. The method of claim 14, the method further comprising:
synchronizing the capture of the second image with a capture of the first image by communicating a time with the second tape node to begin capture of the first and second images.

19. The method of claim 14, wherein the performing the computer vision techniques on the first and second images further comprises:
transmitting, by the first tape node, to a third tape node, the first and second images for the third tape node to perform the computer vision techniques; and
receiving, from the third tape node, the determined load status of the asset container.

* * * * *